United States Patent [19]

Imaeda

[11] Patent Number: 5,751,700
[45] Date of Patent: May 12, 1998

[54] COMMUNICATION TERMINAL APPARATUS

[75] Inventor: Eiji Imaeda, Tokyo, Japan

[73] Assignee: Canon Kabushiki Kaisha, Japan

[21] Appl. No.: 529,087

[22] Filed: Sep. 15, 1995

[30] Foreign Application Priority Data

Sep. 22, 1994 [JP] Japan .................... 6-228316

[51] Int. Cl.$^6$ .................................. H04L 12/18
[52] U.S. Cl. .................. 370/263; 348/15; 370/535; 370/538
[58] Field of Search .................. 348/14, 15, 17, 348/423; 370/260, 263, 264, 265, 503, 535, 537, 538, 543, 916

[56] References Cited

U.S. PATENT DOCUMENTS 5,003,532  3/1991  Ashida et al. ................ 348/15
5,123,012  6/1992  Suzuki et al. ............... 370/535
5,231,492  7/1993  Dangi et al. ................ 348/15
5,444,477  8/1995  Yamadera .................... 348/15

Primary Examiner—Benedict V. Safourek
Attorney, Agent, or Firm—Fitzpatrick, Cella, Harper & Scinto

[57] ABSTRACT

A communication terminal apparatus for multiplexing a plurality of different types of data and for performing communications using the multiplexed data includes a network control unit connected to a communication network for transmission and reception of the plurality of different types of data. A multiplexing unit generates transmission data by multiplexing the plurality of different types of data and outputs the transmission data to the line control unit. A synchronizing unit generates a transmission synchronizing signal of the multiplexing unit. A separating unit separates reception data received from the network control unit in units of data type synchronously with the transmission synchronizing signal generated by the synchronization unit. A loop back path can be used for looping back and inputting the separated reception data to the multiplexing unit, and an adding unit adds dummy data to the looped back reception data.

15 Claims, 29 Drawing Sheets

FRAME STRUCTURE

FIG. 2
EVEN FRAME
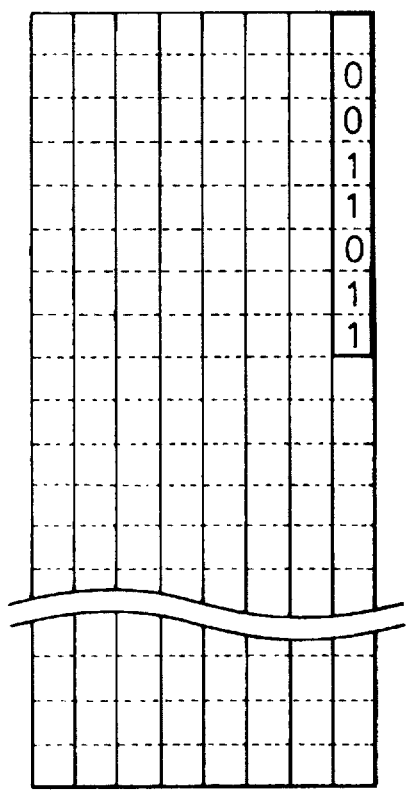
ODD FRAME
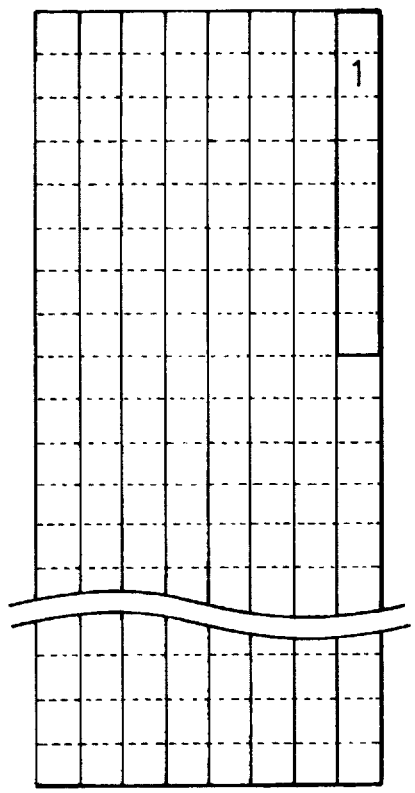

| FIG. 3A | FIG. 3B |

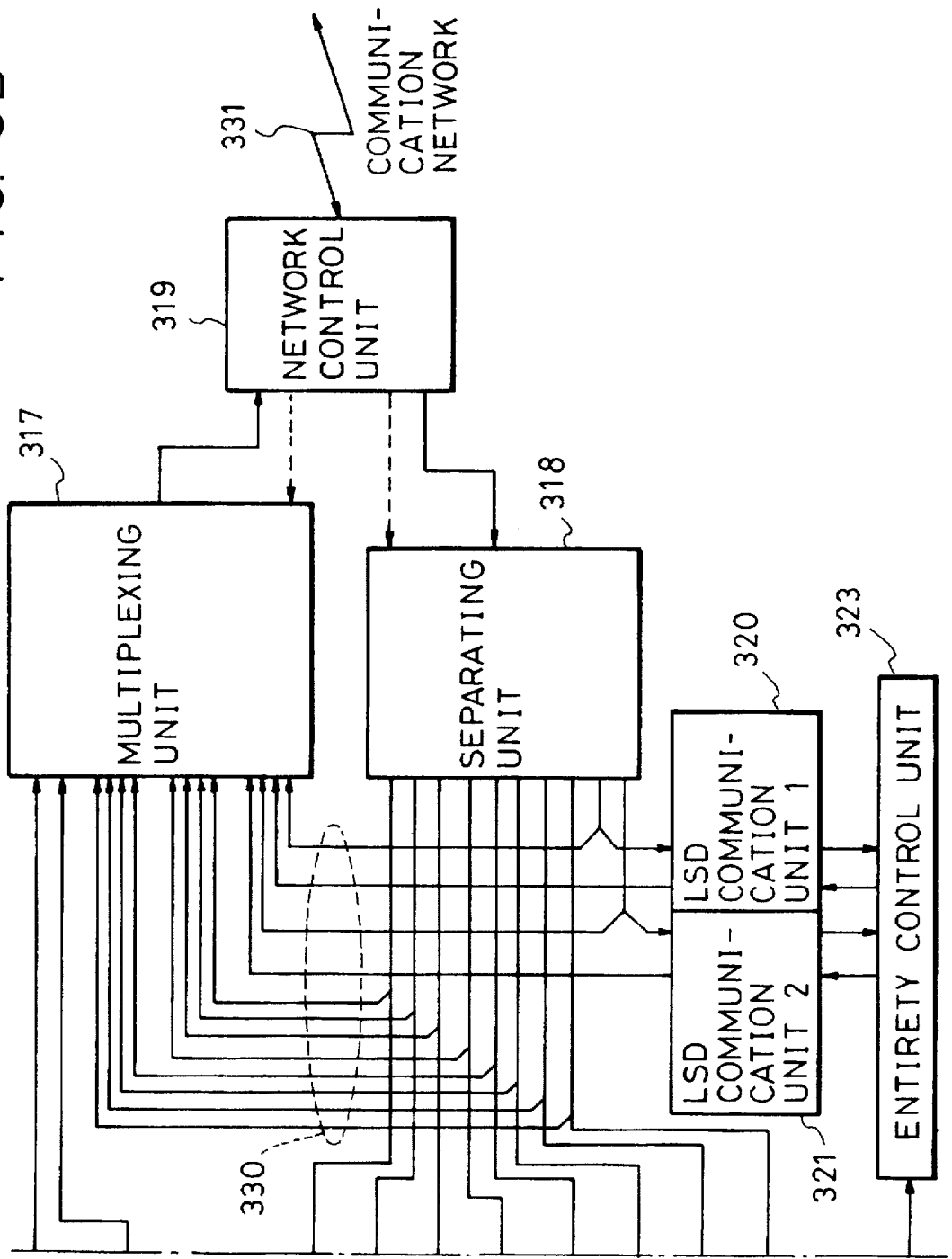

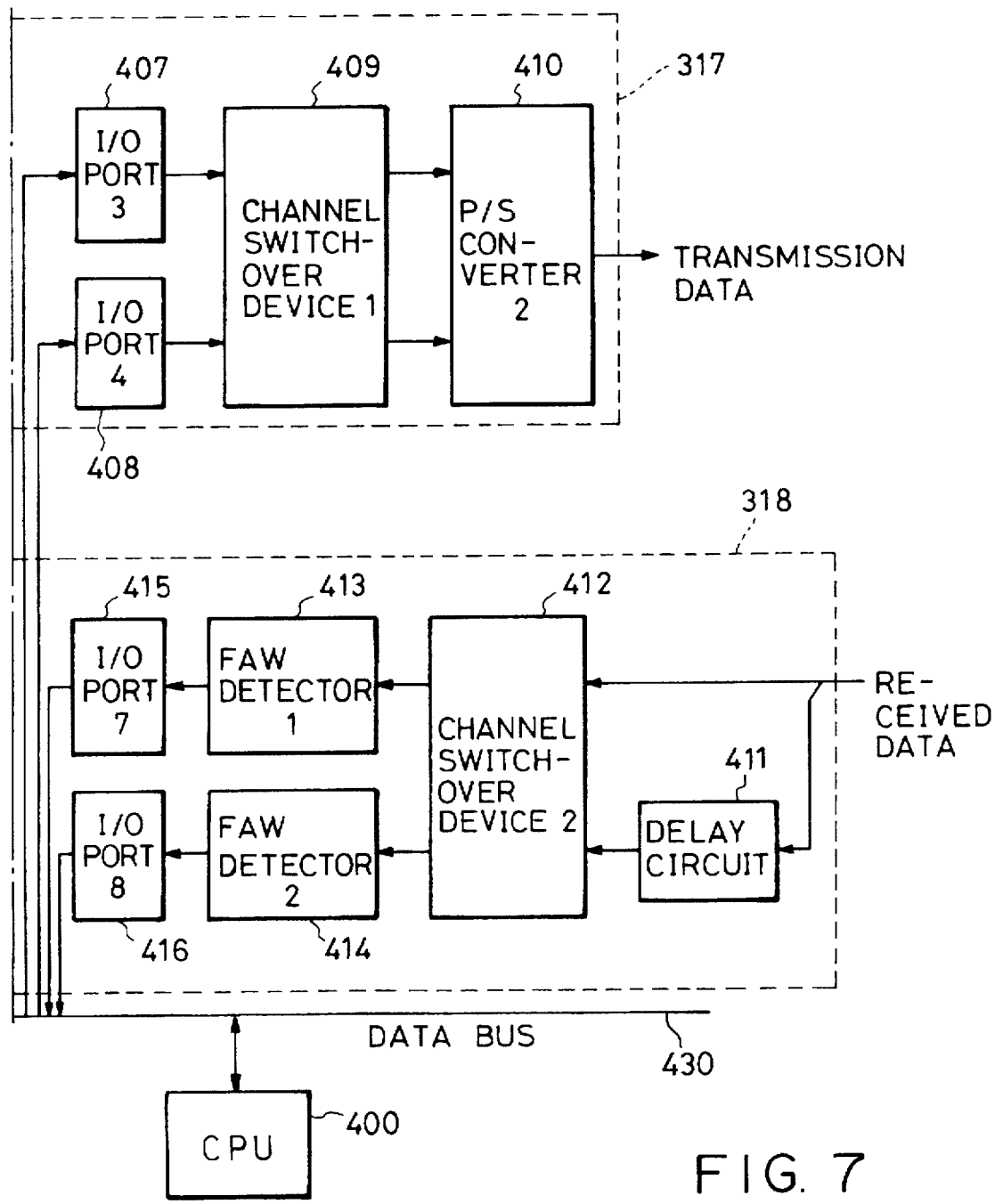

Bb/a-Rx

Ba/b-Tx

Be/a-Rx

Ba/e-Tx

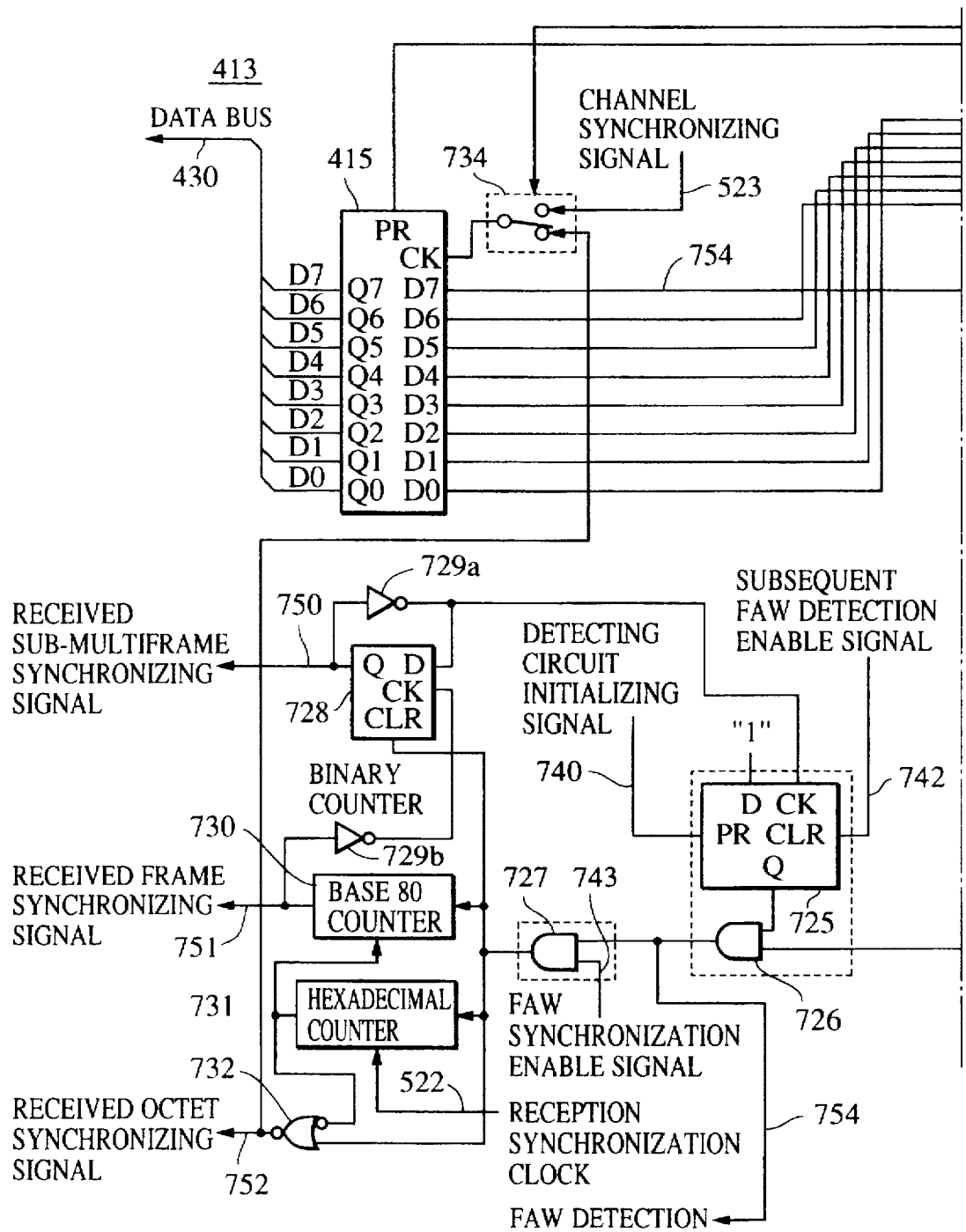
FIG. 11A
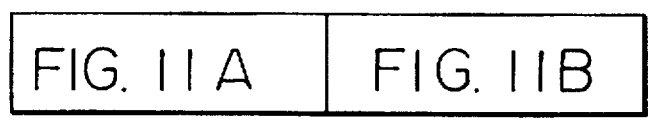

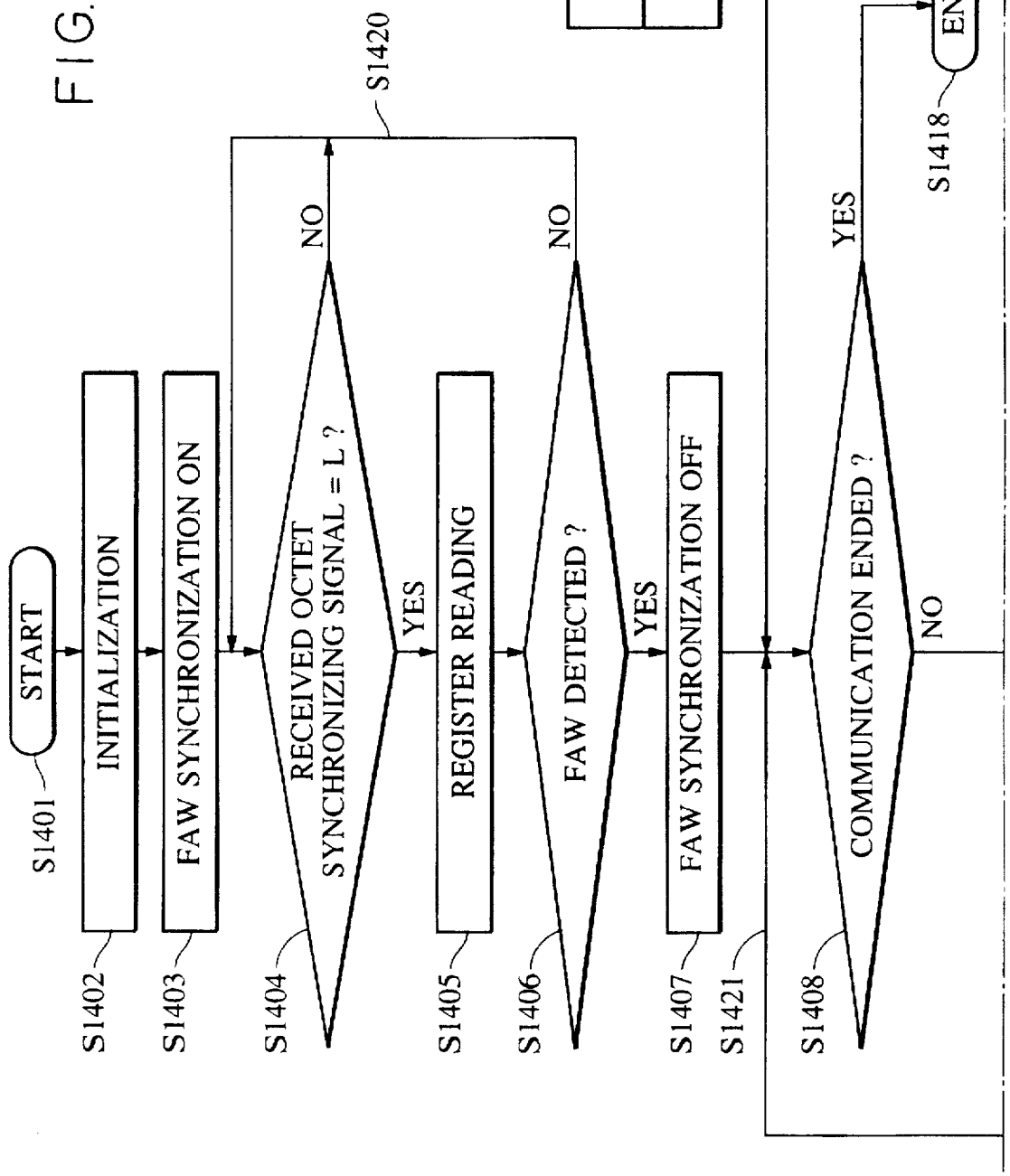

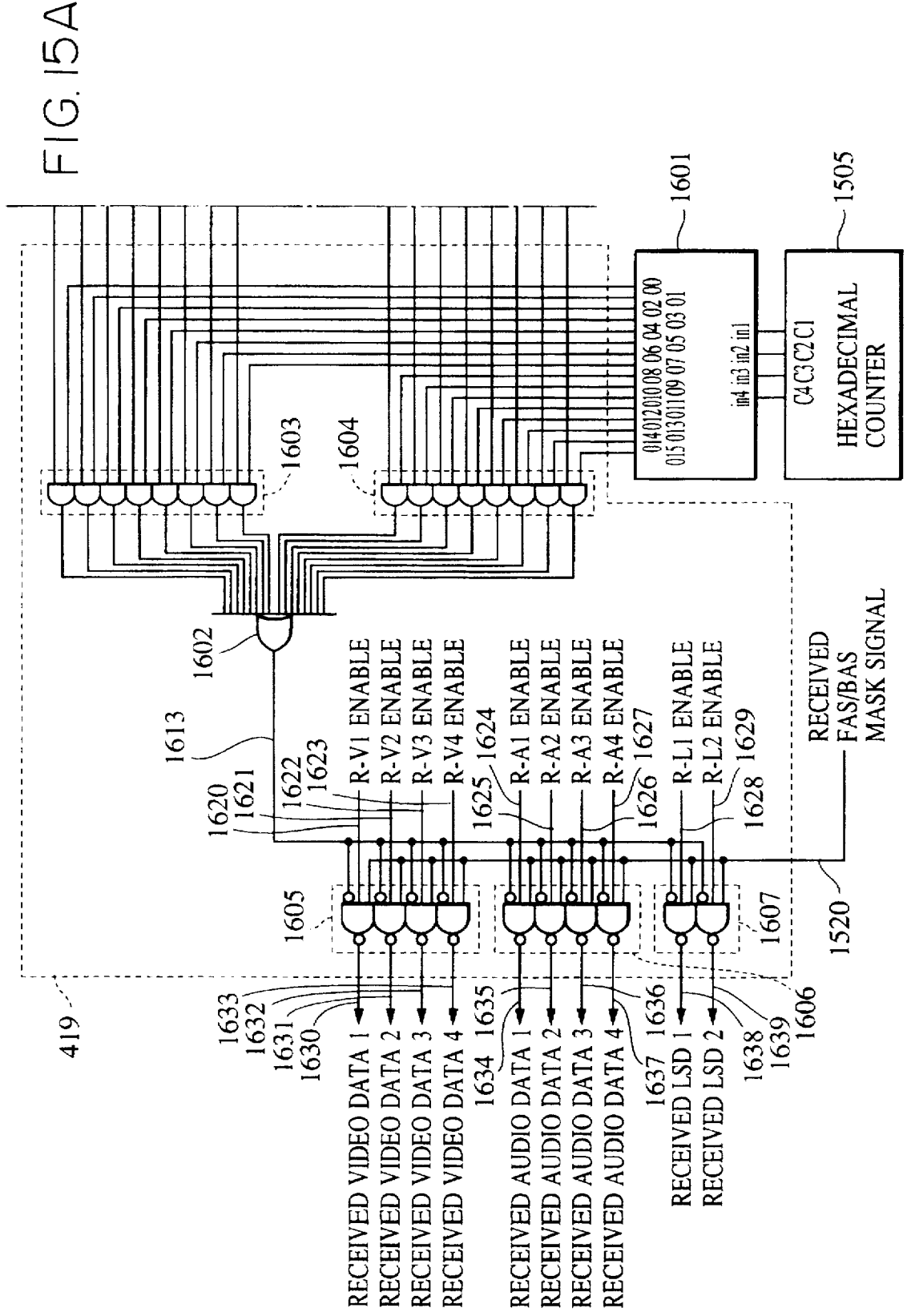

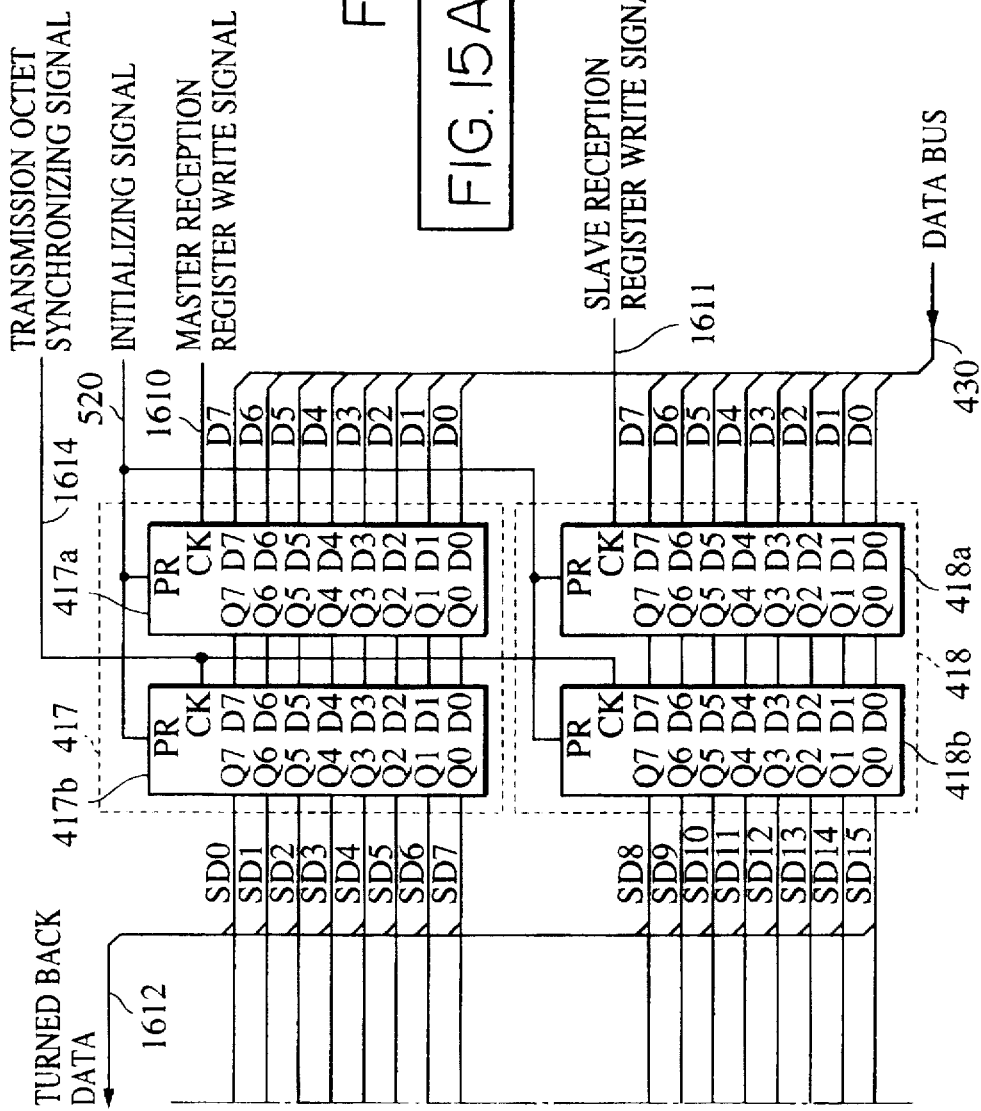

| FIG. 18A | FIG. 18B |

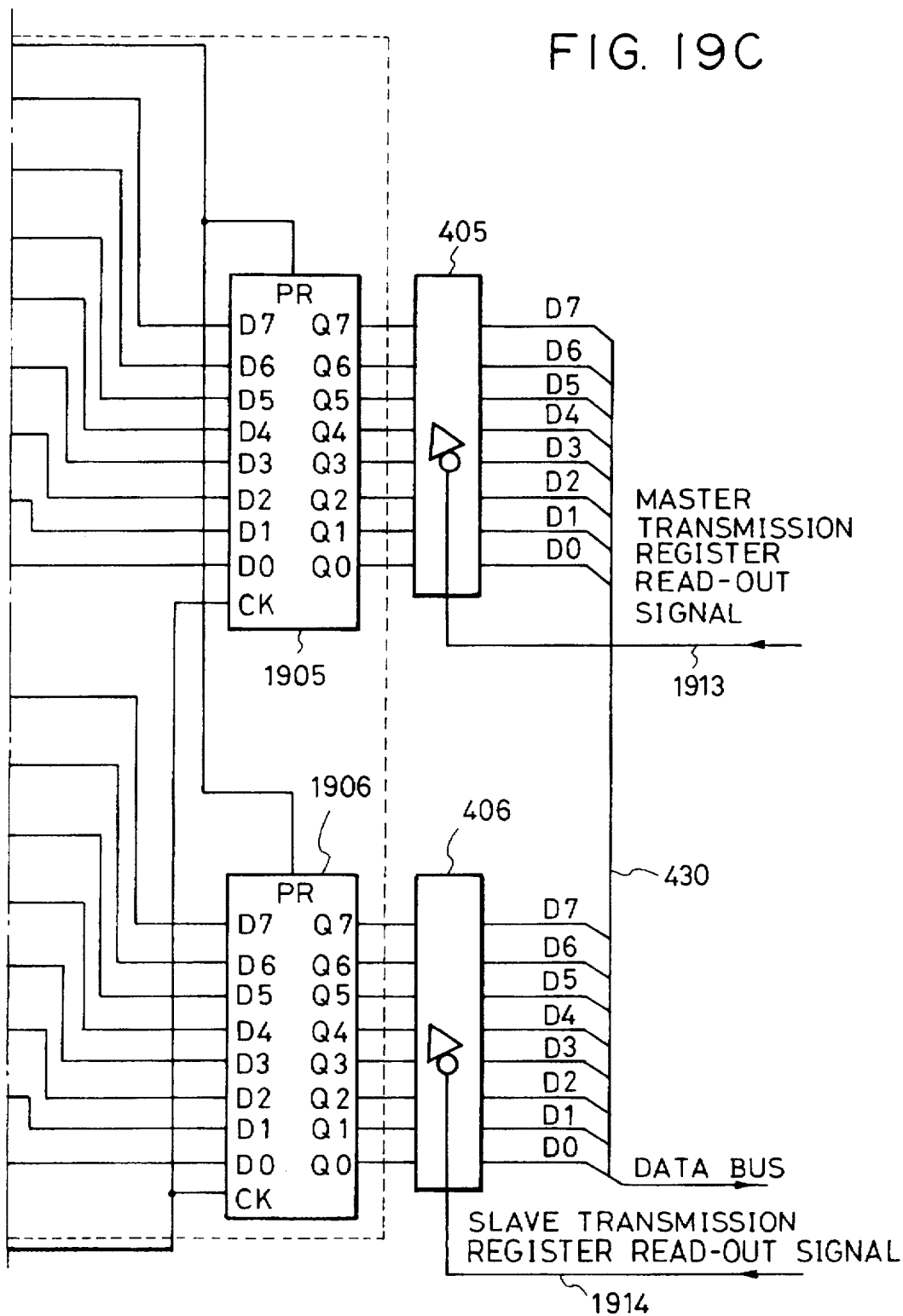

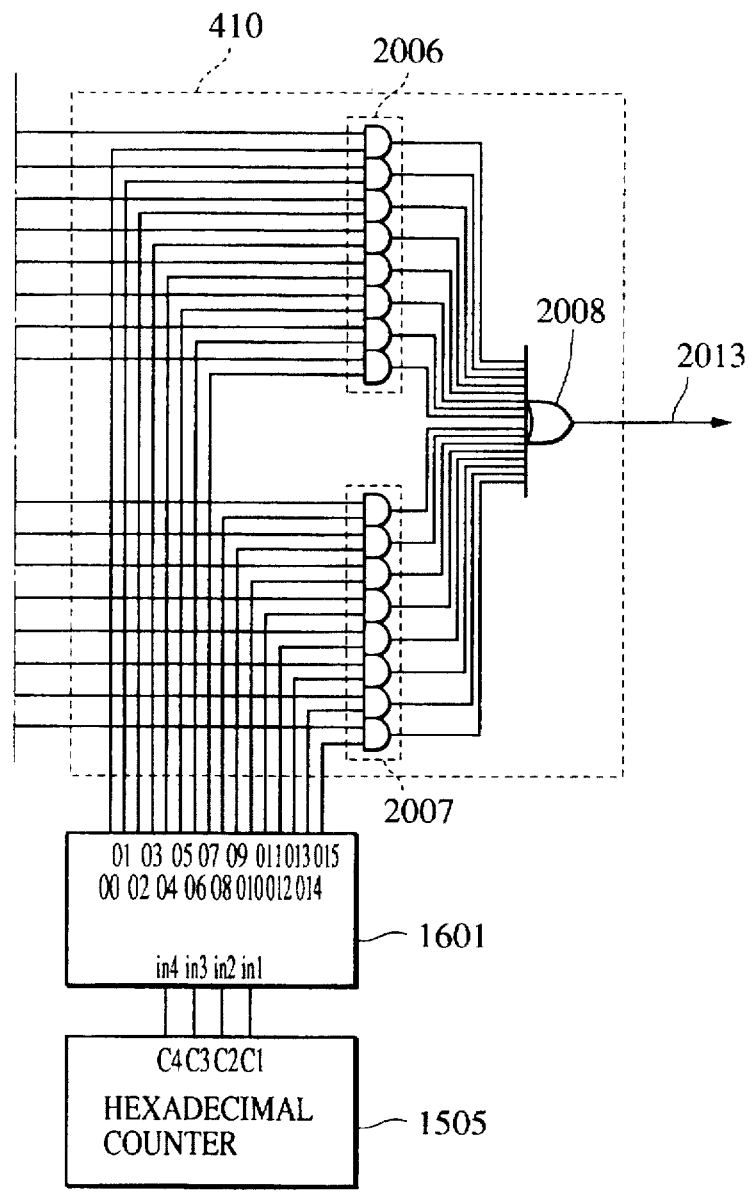

COMMUNICATION TERMINAL APPARATUS

BACKGROUND OF THE INVENTION

1. Field of the Invention

The present invention relates to a communication terminal apparatus, and more particularly to data reception and transmission system of a communication terminal apparatus which is involved in multimedia communications which take place between many sites.

2. Description of the Related Art

In ITU-TS (former CCITT (The International Telegraph and Telephone Consultative Committee)), the ISDN (Integrated Service Digital Network) interface has been standardized in recent years as a digital telecommunication line to promote its practical use. As a communication terminal which utilizes the ISDN service and handles plural media, such as audio data and image data, a multimedia communication terminal, for example, a visual telephone system, is known. Such multimedia communication terminals perform telecommunications using the common functions of the functions provided in the respective terminals. Thus, a transmission frame structure, in which signals of various media, such as audio data and image data, are multiplexed on a network line, must be made common to the multimedia communication terminals. That transmission frame structure has been determined by ITU-TS Recommendation H.221. Various transmission modes in which communications are conducted between the terminals have been defined by ITU-TS Recommendation H.242.

An example of the transmission frame structure defined by H.221 is shown in FIG. 1. In FIG. 1, FAS indicates a frame alignment signal which is made up of framing information, control information, alarm information and so on. BAS is a bit-rate allocating signal made up of a terminal capability with which channels in a frame are configured and so on. In the frame shown in FIG. 1, every 80 bits in a longitudinal direction form a sub-channel. Sub-channels are numbered as sub-channel #1, sub-channel #2, . . . sub-channel #8 with each sub-channel having its leading bit following the previous sub-channel. Since the first 16 bits of sub-channel #8 are allocated to FAS and BAS, sub-channel #8 is constituted by the remaining 64-bit data. Transmission data of each medium is allocated in units of a sub-channel. In data transmission which employs the frame structure conforming to H.221, one FAS and BAS are provided one for each frame.

The above-described frame can be either an even frame or an odd frame of a sub-multiframe. In other words, an even frame and an odd frame in combination form a sub-multiframe. Eight such sub-multiframes form a multiframe. FAS and BAS of an even frame and FAS and BAS of an odd frame make one pair. A bit pattern of a frame alignment word, known as FAW, is inserted into FAS of an even frame and into FAS of an odd frame. As shown in FIG. 2, the bit pattern of FAW inserted into the even frame from octet #2 to octet #8 is "0011011", while the bit pattern of FAW inserted into the odd frame at octet #2 is "1".

When data is transmitted using the above-described frame structure, since separation of reception data for every data type is performed synchronously with FAS, multiplexing of transmission data is asynchronous with separation of reception data. Thus, when loop back (turn back) communication, in which reception data is looped back to a transmission data multiplexing unit, is performed, synchronization must be taken for the looped back data, making the circuit and processing complicated.

SUMMARY OF THE INVENTION

In view of the aforementioned problem of conventional data telecommunications, an object of the present invention is to provide a communication terminal apparatus which enables reception data to be readily looped back to a transmission multiplexing unit and which enables looped back data to be readily decoded.

To achieve the above-described object, in one aspect of the present invention, there is provided a communication terminal apparatus for performing communications using a plurality of different types of multiplexed data which comprises network control means connected to a communication network for transmission and reception of the plurality of different types of data, multiplexing means for generating transmission data by multiplexing the plurality of different types of data and for outputting the transmission data to the network control means, synchronization means for generating a transmission synchronizing signal of the multiplexing means, and separation means for separating reception data from the network control means in the unit of data type synchronously with the transmission synchronizing signal generated by the synchronization means.

In another preferred form of the present invention, there is provided a communication terminal apparatus designed to perform communications using a plurality of different types of multiplexed data, which comprises network control means connected to a communication network for transmission and reception of the plurality of different types of data, separation means for separating received data from the network control means in the unit of data type, multiplexing means for generating transmission data by multiplexing the plurality of different types of data and for outputting the transmission data to the network control means, a loop back path for looping back and inputting the reception data separated in the unit of data type by the separation means to the multiplexing means, and addition means for adding dummy data to the looped back reception data.

Other objects, features and advantages of the invention will become apparent from the following detailed description taken in conjunction with the accompanying drawings.

BRIEF DESCRIPTION OF THE DRAWINGS

FIG. 2 illustrate the bit layout of a frame alignment word;

FIG. 15, comprised of 15A and 15B, illustrates the detailed structure of I/O ports and a P/S converter;

DETAILED DESCRIPTION OF THE PREFERRED EMBODIMENTS

Figures 3, 3A:
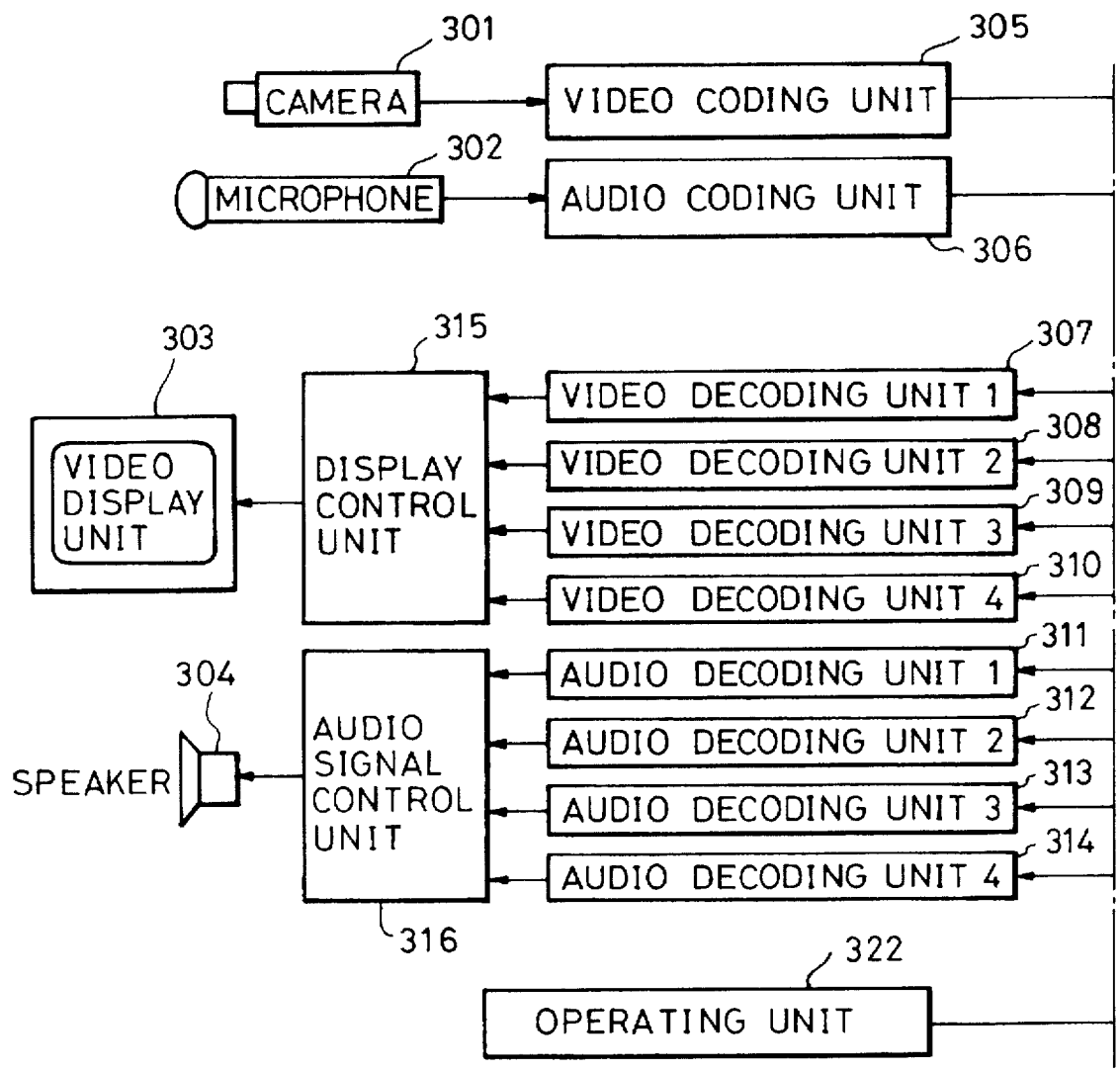
FIG. 3, comprised of FIGS. 3A and 3B, is a block diagram of an embodiment of a communication terminal apparatus according to the present invention.

FIG. 3 illustrates the structure of a multimedia communication terminal apparatus according to the present invention. In FIG. 3, reference numeral 301 denotes a camera for inputting a video signal to be transmitted. Reference numeral 302 denotes a microphone for inputting an audio signal to be transmitted. Reference numeral 303 denotes a video display unit for displaying a received video signal. Reference numeral 304 denotes a speaker for reproducing a received audio signal. Reference numeral 305 denotes a video coding unit for coding a video signal to be transmitted in a predetermined communication data format. Reference numeral 306 denotes an audio coding unit for coding an audio signal to be transmitted in a predetermined communication data format. Reference numerals 307 through 310 respectively denote video decoding units for decoding reception video data into a video signal. Reference numerals 311 through 314 respectively denote audio decoding units for decoding reception audio data e into an audio signal. Reference numeral 315 denotes a display control unit for selecting a single video signal or a plurality of video signals from the four output of video signals respectively decoded by the video decoding units 307 through 310 and for displaying the selected image or images on the video display unit 303. Reference numeral 316 denotes an audio signal control unit for selecting a single audio signal or a plurality of audio signals from the four output of audio signals respectively denoted by the audio decoding units 311 through 314, for adding the selected audio signals and for outputting the added audio signals to the speaker 304.

Reference numerals 320 and 321 denote LSD communication units for controlling data communication between terminals. Reference numeral 317 denotes a multiplexing unit for selecting media to be transmitted to a remote communication terminal and for multiplexing the selected media in a predetermined form. Reference numeral 318 denotes a separating unit for separating the communication data received from a remote communication terminal by media. Reference numeral 319 denotes a network control unit for controlling both connection to and from a communication network and transmission and reception of data to and from the communication network. Reference numeral 322 denotes an operating unit from which the operator performs control of the apparatus. Reference numeral 323 denotes a general control unit for controlling the entire operation of the multimedia communication terminal apparatus. Reference numeral 331 denotes a communication line which is an ISDN basic rate interface (2B+D) in this embodiment. Reference numeral 330 denotes a turn back path from the separating unit 318 to the multiplexing unit 317.

The video coding unit 305 codes a video signal according to the H.261 Recommendation of ITU-TS and sends the coded video signal to the multiplexing unit 317. The H.261 Recommendation is the video signal coding system for high-efficiency coding of a video signal utilizing interframe correlation and appropriately using three coding systems including the inter frames (Inter) coding system, the intra frame (INTRA) coding system and the motion compensation (MC) coding system. In the coding method according to the H.261 Recommendation, since the amount of coded data generated can be appropriately controlled, communication data can be coded according to any bit rate thereof. The video decoding units 307 through 310 receive, from the separating unit 318, reception data coded according to the H.261 Recommendation, and decode the received data in the form of a video signal.

The audio coding unit 306 codes an audio signal according to the G.711 or G.726 Recommendation of ITU-TS, and inputs the coded audio signal to the mutiplexing unit 317. The G.711 Recommendation is the PCM coding method for converting an audio signal up to 4 kHz bandwidth into 8-bit quantized data. The data generation rate is 64 kbits/sec. The G.726 Recommendation is the coding method for further compressing the PMC coded data of the G.711 Recommendation by the ADPCM method. There are four types of coding modes in the G.726 Recommendation. The data generation rates of these modes are 40 kbits, 32 kbits, 24 kbits and 16 kbits/sec, respectively. The audio decoding units 311 through 314 receive, from the separating unit 318, the reception data coded according to the G.711 or G726, and decode the received data into an audio signal.

The LSD communication units 320 and 321 process the data communication function between the terminals associated with communication. The communication protocol employed in this embodiment is the HDLC protocol. Since the HDLC protocol is known, a description thereof is omitted. The data transfer rate of the LSD communication units 320 and 321 can be any value. Although dependent on the applications of the apparatus, examples of the communication data contents include text file data of a text, communication line connection data between the terminals and so on.

The multiplexing unit 317 selects desired media data from the video coding unit 305, the audio coding unit 306 and the LSD communication units 320 and 321, and multiplexes the selected data in a predetermined multiplexing method. The separating unit 318 separates the received communication data by media, and allocates the separated data to the video decoding units 307 through 310, the audio decoding units 311 through 314 and the LSD communication units 310 and 321. The loop back path (turn back path) 330 loops back from the separating unit 318 to the multiplexing unit 317. Through the loop back path 330, the received data in any media is looped back to the multiplexing unit 317 so that it can be multiplexed with other transmission data for transmission. Multiplexing is done by allocating a single subchannel or a plurality of sub-channels shown in FIG. 1 as the data channel or channels for any media. Prior to communications, setting of allocations is made between a transmitting terminal and a receiving terminal. An example of sub-channel allocation is illustrated in FIG. 4.

Figure 4:
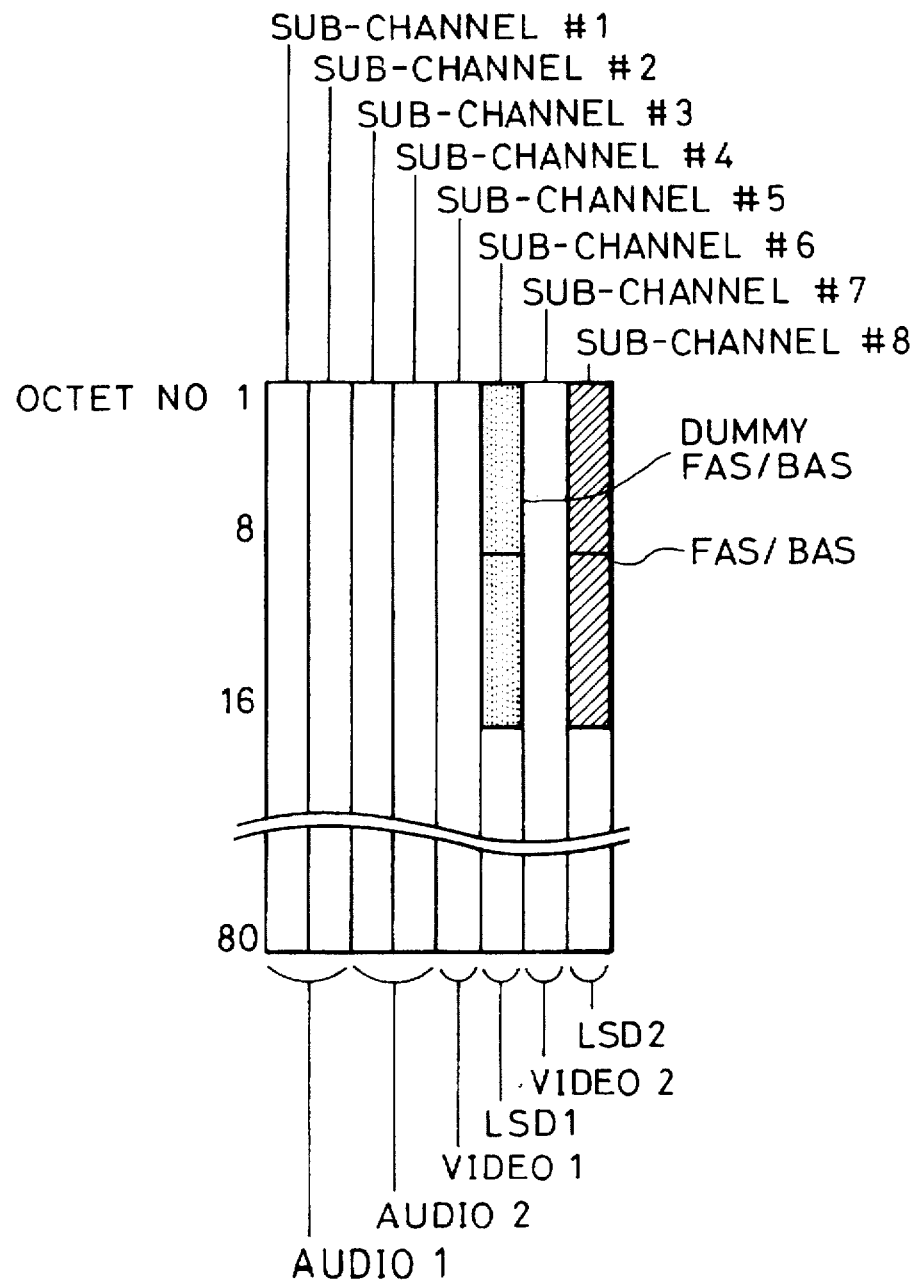
FIG. 4 illustrates the bit layout of dummy FAS/BAS.

In the example shown in FIG. 4, sub-channels #1 and #2 are allocated to audio data 1, and sub-channels #3 and #4 are allocated to audio data 2. Data is transmitted and received in a single sub-channel at 8 kbps. Thus, audio data 1 and 2 are each audio data communications at 16 kbps. A sub-channel #5 is allocated to video data 1, and a sub-channel #7 is allocated to video data 2. Since both video data 1 and 2 employ a single sub-channel, the data rate of each of the video data 1 and 2 is 8 kbps. A sub-channel #6 is allocated to LSD1, and a sub-channel #8 is allocated to LSD2. The sub-channel #6 contains a dummy FAS/BAS. Thus, the data rate of each of the sub-channels #6 and #8 is 6.4 kpbs. The dummy FAS/BAS will be described below.

The network control unit 319 performs call connection control with a remote terminal and data transmission and reception through the communication network 331. In this embodiment, the communication network 331 is the ISDN basic rate interface (2B+D). The ISDN basic rate interface is made up of two logical connection of 64 kbps, known as Bch, and a single logical connection (16 kbps) for call connection, known as Dch. Bch is a communication channel for data transmission to and data reception from a remote terminal, and Dch is a communication channel for communications of call connection data between terminals and the network. The communication network 331 is a line through which a line of data is serially transmitted and received at a bit rate of 192 kbit/sec. The network control unit 319 separates two types of Bch data from the data line, and inputs the separated data to the separating unit 318 in a data form in which the data is time-division multiplexed in every octet (8 bits). The network control unit 319 also time-division multiplexes two types of Bch data, and sends the multiplexed data to the communication network 331.

As shown by the broken line, synchronization means in the network control unit 319 supplies, to the mutiplexing unit 317, a transmission synchronizing clock of 128 kHz and a transmission channel synchronizing signal as transmission synchronization timing signals so as to enable the multiplexing unit 317 to send transmission data to the network control unit 319 synchronously with the transmission synchronizing clock. Transmission data is sent to the network control unit 319 in a form in which the first B channel B1 and the second B channel B2 are time-division multiplexed every octet. The transmission channel synchronizing signal indicates that transmission data is either the B1 channel or the B2 channel.

Figure 5:
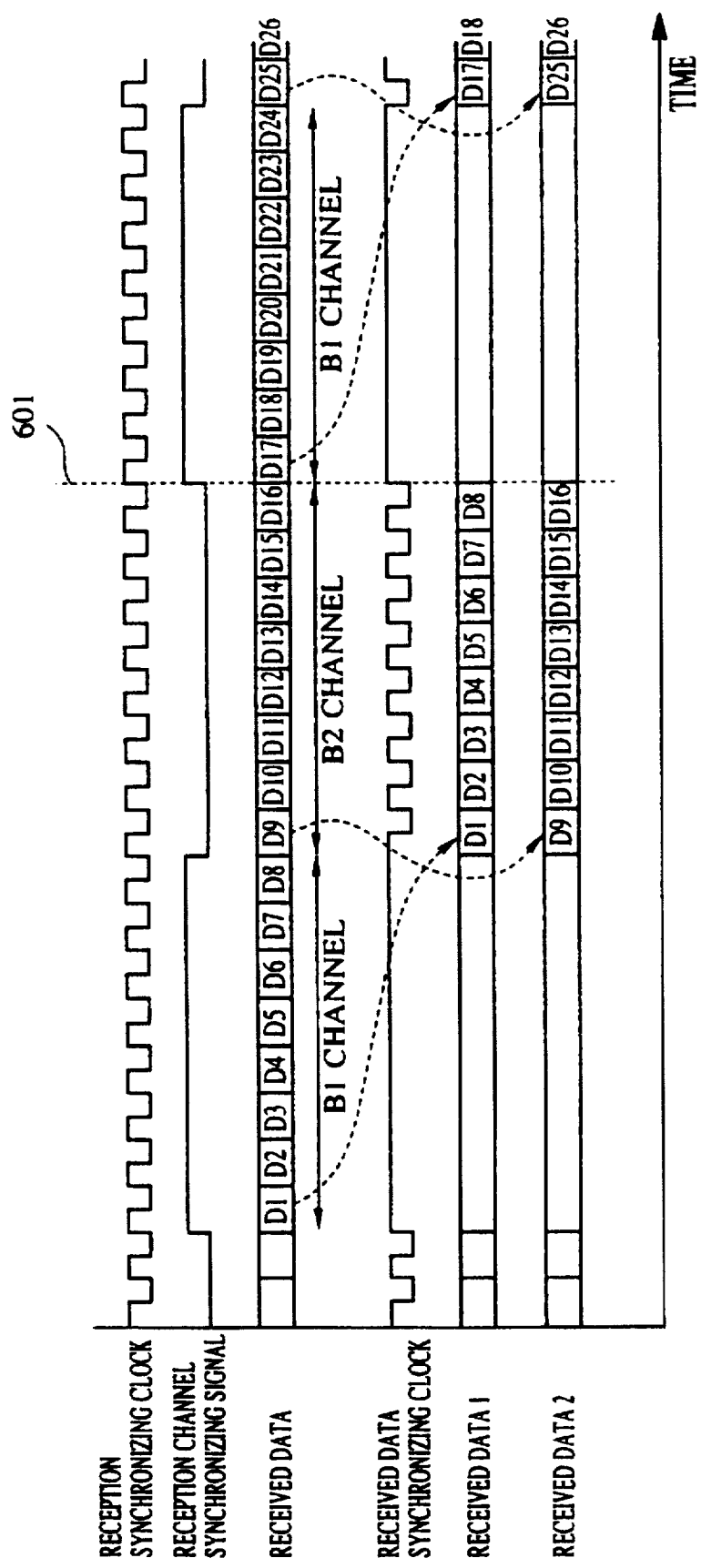
FIG. 5 is a timing chart showing the operation of a delay circuit and that of a channel switch-over circuit.

The above-described synchronization means in the network control unit 319 sends, to the separating unit 318, a reception synchronizing clock of 128 kHz, a reception channel synchronizing signal and reception data which is in synchronization with the reception synchronizing clock, as shown by the broken line. Reception data is data in which data of the B1 channel and data of the B2 channel are time-division multiplexed in every single octet. The reception channel synchronizing signal indicates that reception data is either the B1 channel or the B2 channel. FIG. 5 is a timing chart of the reception synchronizing clock, the reception channel synchronizing signal and reception data. The transmission synchronizing timing signal has a similar timing.

Figure 6:
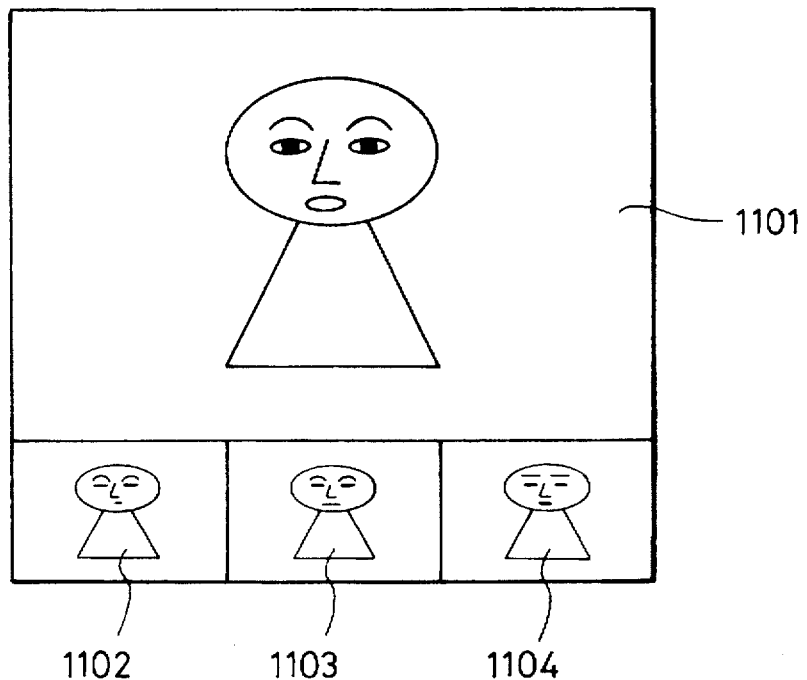
FIG. 6 illustrates an example of the display screen for multiple site communications.

The display control unit 315 synthesizes the video signals sent thereto from the video decoding units 307 to 310, and displays the resultant signal on the video display unit 303. A display example is shown in FIG. 6. The display screen is divided into four portions 1101 through 1104. The screen 1101 displays the image from the video decoding unit 307, the screen 1102 displays the image from the video decoding unit 308, the image from the video decoding unit 309, and the screen 1104 displays the image from the video decoding unit 310.

The audio signal control unit 316 adds the audio signals sent thereto from the audio decoding units 311 to 314, and outputs the added audio to the speaker 304.

The operating unit 322 is a control data input unit through which the operator of the terminal apparatus inputs control data for controlling the operation of the terminal apparatus. The general control unit 323 controls the operation of each of the functional blocks according to the control data input from the operating unit 322.

Figure 7A:
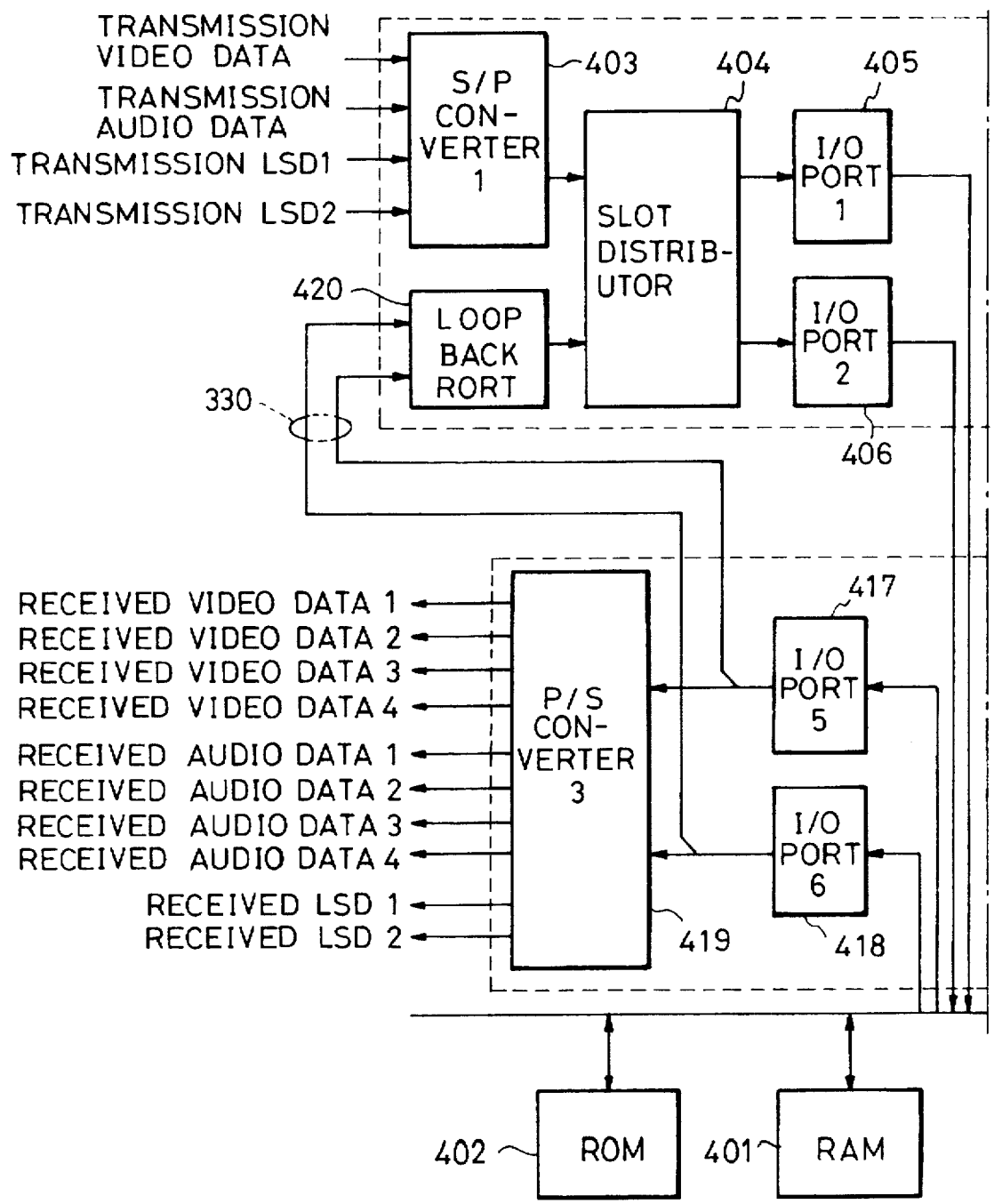
FIG. 7, comprised of FIGS. 7A and 7B, illustrates the structure of a multiplexing unit, separating unit and loop back path in the communication terminal apparatus shown in FIG. 3.

FIG. 7 is a block diagram illustrating the structure of the multiplexing unit 317, separating unit 318 and loop back path 330. Reference numeral 400 denotes a control CPU of the block for controlling the operations of the multiplexing unit 317, separating unit 318 and loop back path 330. Reference numeral 402 denotes a ROM in which the operation program of the CPU 400 is stored. Reference numeral 401 denotes a RAM used as a work memory of the CPU 400 and to temporarily store transmission data and reception data. Reference numeral 430 denotes a data bus of the CPU 400.

Reference numeral 403 denotes a S/P converter for converting serial data, including the transmission video data sent from the video coding unit 305, the transmission audio data sent from the audio coding unit 306, the transmission data LSD1 sent from the LSD communication unit 320 and the transmission data LSD2 sent from the LSD communication unit 321, into parallel data.

Reference numeral 404 denotes a slot distributor for distributing the data from respective media and the looped back data to desired slots of the sub-channels.

I/O ports 405 and 406 are I/O ports through which the CPU 400 reads in the transmission data from the slot distributor 404.

I/O ports 407 and 408 are I/O ports through which the CPU 400 sends transmission data to a channel switch-over device 409.

The channel switch-over device 409 switches over two types of transmission data written in the I/O ports 407 and 408 so as to allow them to be respectively allocated to two types of Bchs of the line control unit 319.

A P/S converter 410 is a parallel/serial converter for converting the parallel data from the channel switch-over device 409 into serial transmission data in which two types of Bch data are multiplexed.

A delay circuit 411 delays a received data line by a time corresponding to 1 octet. A channel switch-over device 412 switches over two types of data, including received data and data which has passed through the delay circuit 411, so as to allow them to be respectively connected to FAW detectors 413 and 414.

The FAW detectors 413 and 414 detect frame synchronizing signals FAWs defined in the H.221 Recommendation from a received data line.

I/O ports 415 and 416 are I/O ports through which the CPU 400 reads in received data synchronously with FAW timings detected by the FAW detectors 413 and 414, respectively.

I/O ports 417 and 418 are I/O ports through which the CPU 400 sends the received data to a P/S converter 419 and a loop back port 420, respectively.

The P/S converter 419 converts the parallel data written in the I/O ports into serial data separated in every functional block, and sends reception video data 1 through 4 to the video decoding units 307 through 310, reception audio data 1 through 4 to the audio decoding units 311 to 314, and reception data LSD1 and LSD2 to the LSD communication units 320 and 321.

The loop back port 420 is a data selection means for selecting data to be looped back from the data written in the I/O ports 417 and 418, and sending the selected data to the slot distributor 404. The data looped back by the loop back port 420 is allocated to a desired transmission sub-channel for transmission.

Figure 8:
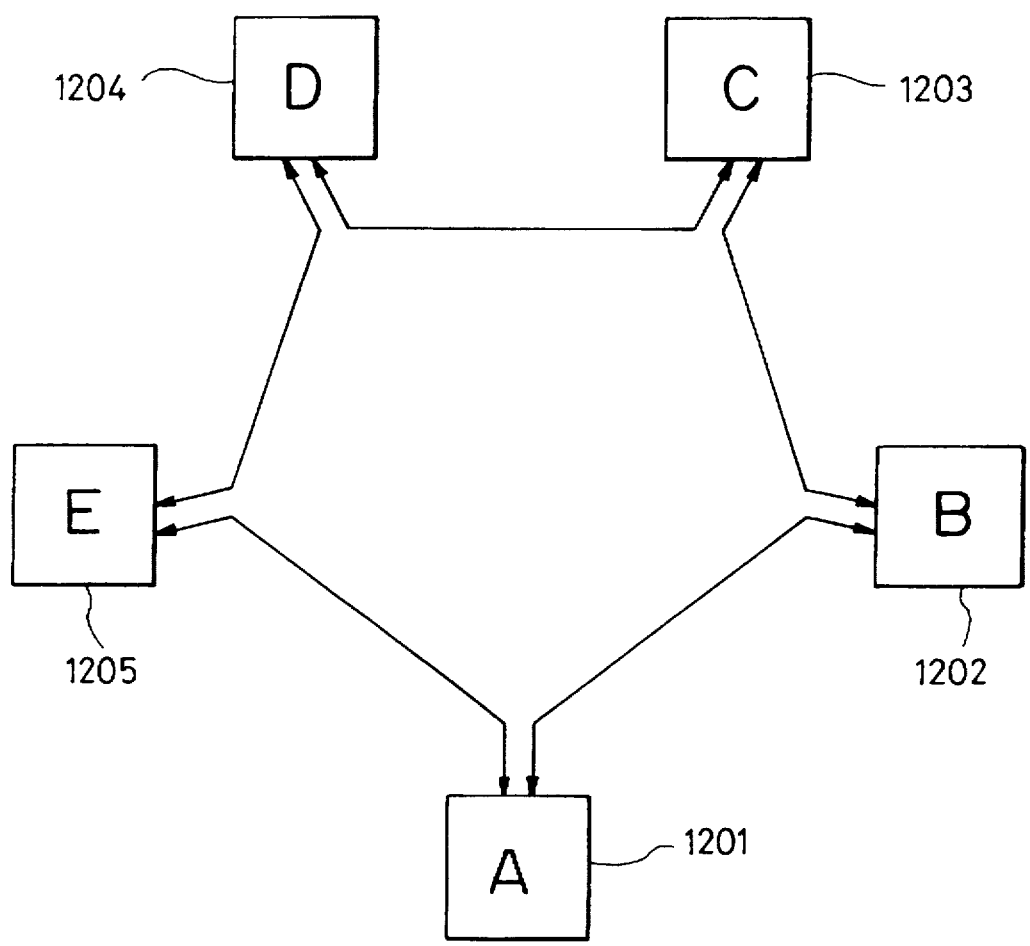
FIG. 8 is a block diagram showing the connections between the multiple sites in a multiple site communication by the communication terminal apparatus.

The concept of an example of loop back communication is illustrated in FIG. 8. Reference numerals 1201 through 1205 respectively denote terminals A through E. These terminals A through E represent multimedia communication terminal apparatuses according to the present embodiment, located at different sites. The respective sites are connected to each other through Bch 64-kpbs data channels. The basic rate interface of ISDN is constructed such that a single line i/f contains two logical lines known as Bchs. The respective Bchs can set calls with separate remote terminals. When viewed from, for example, the terminal A, two Bchs are respectively connected to both the B and E sites. In the following description, Va, Vb, Vc, Vd and Ve respectively represent video data of the transmission images obtained by the cameras of the individual terminals. Aa, Ab, Ac, Ad and Ae respectively represent audio data of the transmission audios input by the microphones 302 of the individual terminals.

Figure 9:
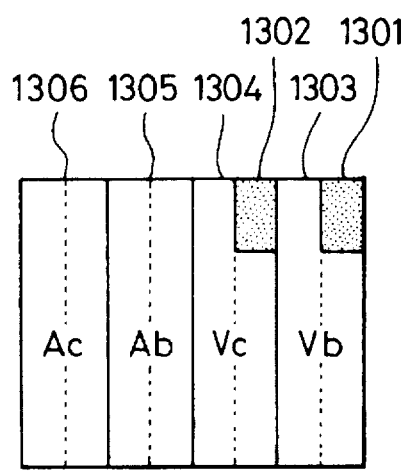
FIGS. 9(1), 9(2), 9(3) and 9(4) illustrate frame structures for the multiple site communications by the communication terminal apparatus.
Figure 9:
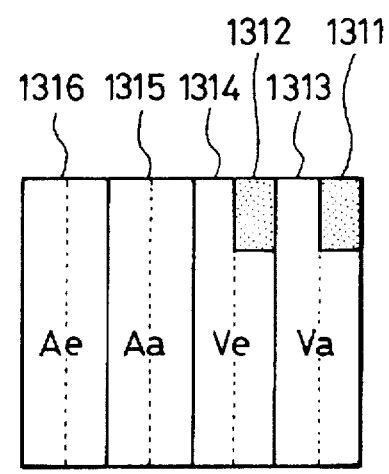
Figure 9:
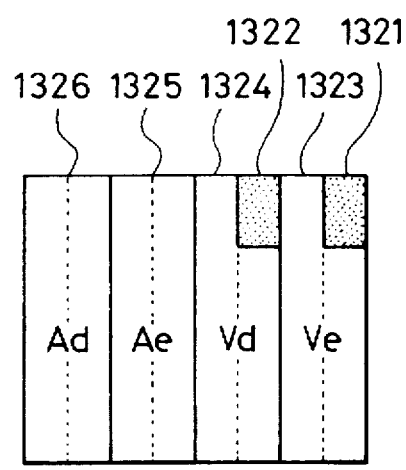
Figure 9:
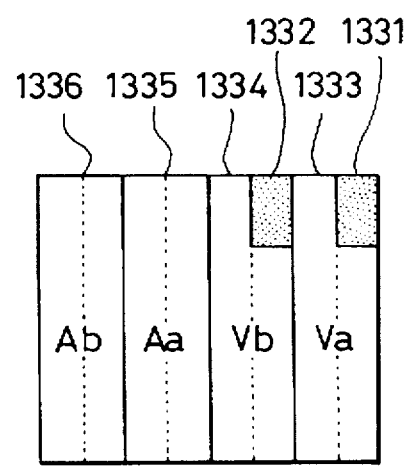

FIG. 9 illustrates the sub-channel structures of communication data transmitted the Bchs of terminal A. Bb/a-Rx shown in FIG. 9(1) is the structure of reception Bch received by terminal A from terminal B. Ba/b-Tx in FIG. 9(2) is the structure of transmission Bch transmitted from terminal A to terminal B. Be/a-Rx in FIG. 9(3) is the structure of reception Bch received by terminal A from terminal E. Ba/e-Tx in FIG. 9(4) is the structure of transmission Bch transmitted from terminal A to terminal E. Each of the Bchs has eight sub-channels, and a total of 64 kbps data rate.

Reference numerals 1301, 1311, 1321 and 1331 respectively denote FAS/BASs. Reference numerals 1302, 1312, 1322 and 1332 respectively denote dummy FAS/BASs. The dummy FAS/BAS has the same number of empty bits as the number of bits of the FAS/BAS where no data is contained.

In Bb/a-Rx in FIG. 9(1), received by terminal A from terminal B, audio data Ac (1306) of terminal C is allocated to sub-channels #1 and #2, audio data Ab (1305) of terminal B is allocated to sub-channels #3 and #4, video data Vc (1304) of terminal C is allocated to sub-channels #5 and #6, and video data Vb (1303) of terminal B is allocated to sub-channels #7 and #8.

In Be/a-Rx in FIG. 9(3), received by terminal A from terminal E, audio data Ad (1326) of terminal D is allocated to sub-channels #1 and #2, audio data Ac (1325) of terminal E is allocated to sub-channels #3 and #4, video data Vd (1324) of terminal D is allocated to sub-channels #5 and #6, and video data Ve (1323) of terminal E is allocated to sub-channels #7 and #8.

In Ba/b-Tx in FIG. 9(2), transmitted by terminal A to terminal B, transmission video data Va (1313) of terminal A is allocated to sub-channels #7 and #8, and transmission audio data Aa (1315) of terminal A is allocated to sub-channels #3 and #4. In the data received by terminal A from terminal E located from the side opposite to the side where terminal B is located, video data Ve (1323) and audio data Ae (1325) of adjacent terminal E are looped back and respectively allocated to sub-channels #5 and #6 as transmission video data Ve (1314) and sub-channels #1 and #2 as transmission audio data Ae (1316).

In Ba/e-Tx in FIG. 9(4), transmitted by terminal A to terminal E, transmission video data Va (1333) of terminal A is allocated to sub-channels #7 and #8, and transmission audio data Aa (1335) of terminal A is allocated to sub-channels #3 and #4. In the data received by terminal A from terminal B, located from the side opposite to the side where terminal E is located, video data Vb (1303) and audio data Ab (1305) of adjacent terminal B are looped back and respectively allocated to sub-channels #5 and #6 as transmission video data Vb (1334) and sub-channels #1 and #2 as transmission audio data Ab (1336).

More specifically, terminal A loops back only the data of the adjacent terminal B in the data of terminals C and B that terminal A receives from terminal B. Terminal A multiplexes the looped back data with the data of terminal A, and transmits the multiplexed data to terminal E. Also, terminal A loops back only the data of the adjacent terminal E in the data of terminals D and E that terminal A receives from terminal E, multiplexes the looped back data with the data of terminal A, and transmits the multiplexed data to terminal B. When data is looped back, the sub-channel allocated positions are switched over: when data is looped back, the data of the adjacent terminal is allocated to sub-channels #3, #4, #7 and #8. Thus, data does not continue to loop.

Regarding, for example, the transmission data of terminal A, looping back of the data is completed when the data has transmitted to terminal C via terminal B and to terminal D via terminal E. Terminals B through E loop back data in the same manner as that of terminal A, whereby each of the terminals is capable of receiving audio data and video data from all other terminals.

The dummy FAS/BAS will be described below. Since FAS and BAS are signals for setting frame synchronization and communication capability between the terminals associated with communication, it is not necessary to loop back FAS and BAS of the terminals between which communication is taking place to the communication which takes place between the terminals different from the above-described terminals. If FAS/BAS of sub-channel #8 in FIG. 9(1) is extracted and received video data Ve (1323) is looped back to transmission video data Ve (1314), since the amount of data is the same, empty bits where no data is present are generated at the position of FAS/BAS of sub-channel #6. Hence, the dummy FAS/BAS is set beforehand at the empty bits position so that the data at that bit position can be ignored in reception. This is why dummy FAS/BAS (1302, 1322) is present at sub-channel #6 of the received data. A reception terminal ignores the data at that bit position.

Figure 10:
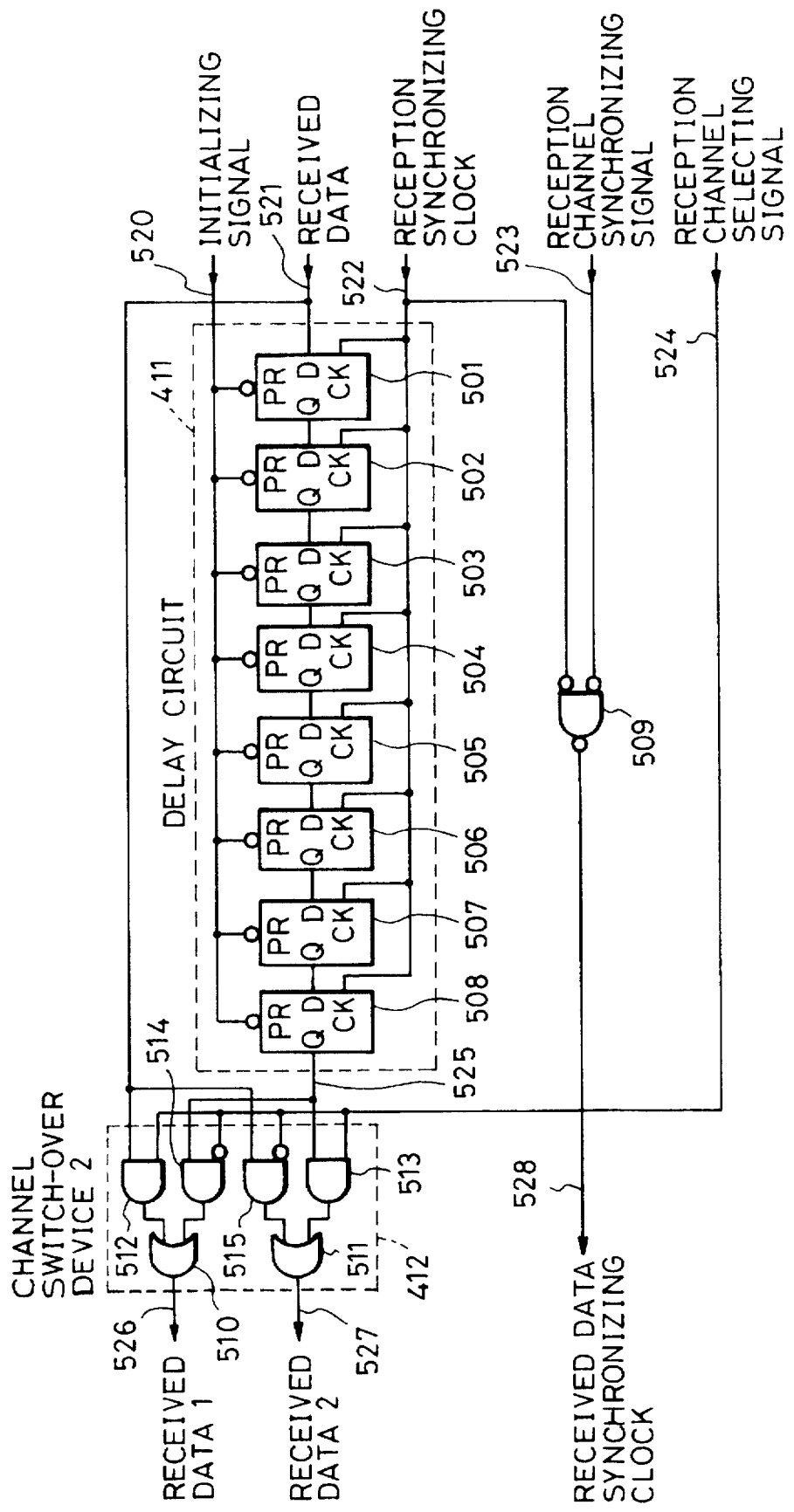
FIG. 10 illustrates the delay circuit and the channel switch-over device.

FIG. 10 illustrates the structure of the delay circuit 411, the circuit of the channel switch-over device 412 and the peripheral circuit thereof. Reference numerals 501 through 508 denote D flip-flops. Reference numerals 509 and 512 through 515 denote AND gates. Reference numerals 510 and 511 denote OR gates. A circle marked at the input/output terminal portion of each of the gates indicates a negative logic input/output.

Reference numeral 520 denotes an initializing signal with which the CPU 400 initializes the delay circuit 411 before communication is started. When the initializing signal 520 is input, the D flip-flops 501 through 508 are initialized to the H level.

Reference numeral 521 denotes received data sent from the line control unit 319. The received data is that of two B channels which are time-division multiplexed in units of octet.

Reference numeral 522 denotes a reception synchronization clock for received data. In this embodiment, the reception synchronization clock is 128 kHz. Reference numeral 523 denotes a reception channel synchronizing signal which indicates the type of time-division multiplexed received data 521, B1 channel data or B2 channel data.

Reference numeral 524 denotes a reception channel selector signal controlled by the CPU 400. The reception channel selector signal determines to which detectors, FAW detector 413, FAW detector 414, the B1 channel and the B2 channel are respectively connected.

FIG. 5 illustrates the operation timing of the delay circuit 411 and channel switch-over device 412 when the reception channel selector signal 524 is at the H level.

The delay circuit 411 sequentially buffers the received data for eight clocks synchronously with the reception synchronization clock 522, and generates received data 525 which is the received data 521 delayed by 1 octet.

When the reception channel synchronizing signal is at the H level, the received data 521 is input to the FAW detector 413 via the AND gate 512 and the OR gate 510 as received data 1 (526), while the delayed data 525 is input to the FAW detector 414 via the AND gate 513 and the OR gate 511 as received data 2 (527). The logical function is implemented on a reception synchronization clock 522 by the reception channel synchronizing signal at the AND gate 509 to generate a received data synchronizing clock 528. The received data synchronizing clock 528 is a burst clock, as shown in FIG. 5, which is input to the FAW detectors 413 and 414 as the data synchronizing clock of the received data 1 (526) and received data 2 (527), respectively.

When the reception channel synchronizing signal is at the L level, the received data 521 is input to the FAW detector 414 via the AND gate 515 and the OR gate 511 as the received data 2 (527), while the delayed data 525 is input to the FAW detector 413 via the AND gate 514 and the OR gate 510 as the received data 1 (526). The generated received data synchronizing clock 528 is the same as that generated when the reception channel synchronizing signal is at the H level.

Figure 11B:
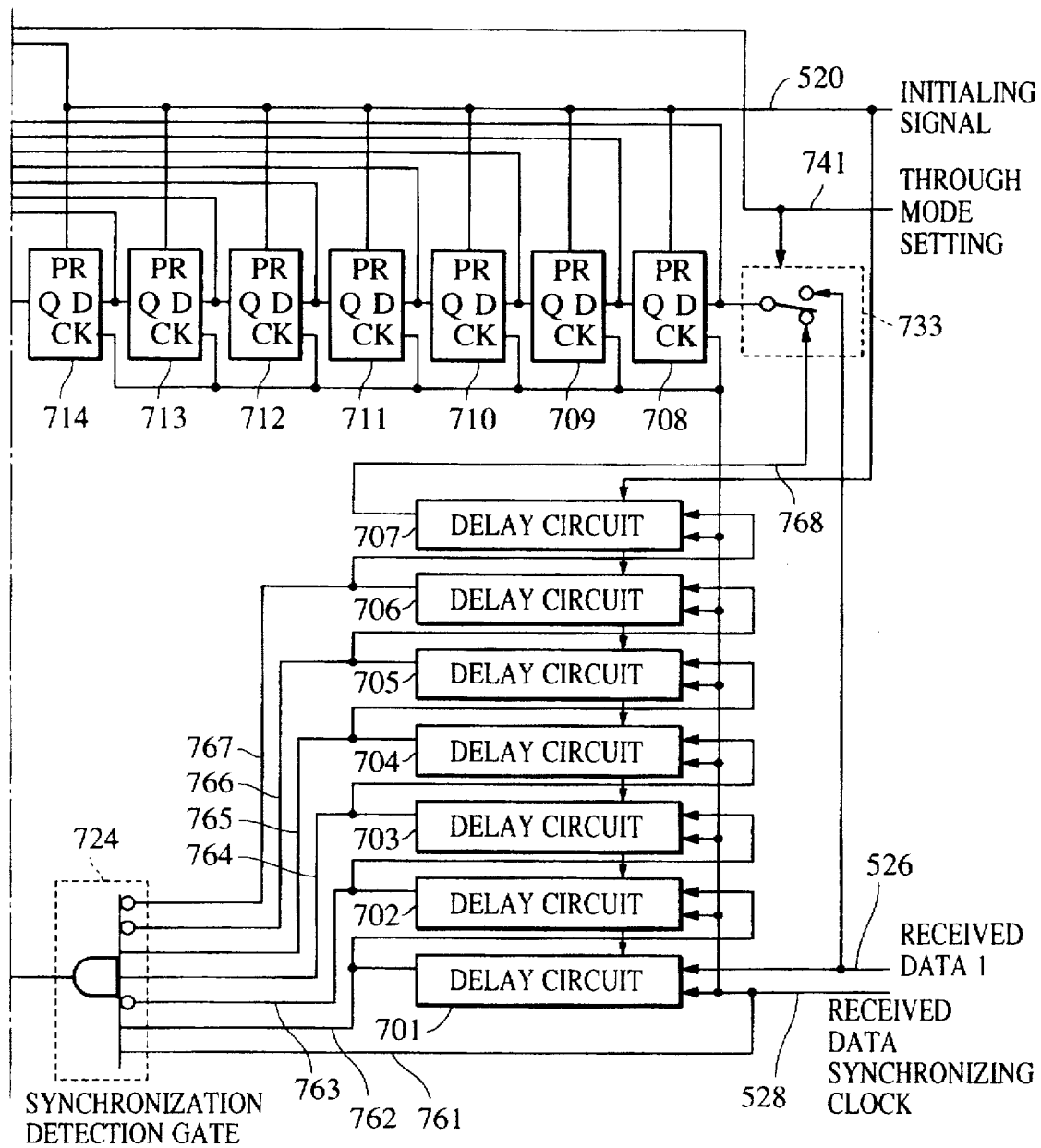
FIG. 11, comprised of FIGS. 11A and 11B, is a circuit diagram of a FAW detecting circuit.

FIG. 11 illustrates the detailed structure of the FAW detector 413. Since the FAW detectors 413 and 414 have the same structure, consideration will be given in FIG. 11 only to the FAW detector 413.

Reference numerals 701 through 707 denote delay circuits. The delay circuits 701 through 707 have the same structure as that of the delay circuit 411. Reference numerals 708 through 714 denote D flip-flops. Reference numeral 415 denotes an 8-bit register. Reference numeral 724 denotes a synchronization detecting gate 724 designed to output the H level when it detects part of input FAW synchronizing pattern "0011011". Reference numeral 725 denotes a D flip-flop which can be preset and clear. Reference numerals 726 and 727 denote AND gates. Reference numeral 728 denotes a D flip-flop. Reference numerals 729a and 729b denote inverters. Reference numeral 730 denotes a base 80 counter. Reference numeral 731 denotes a hexadecimal counter. Reference numeral 732 denotes an OR gate. Reference numerals 733 and 734 denote switch-over circuits.

A detection circuit initializing signal 740 is a signal for initializing the FAW detector 413. The CPU 400 controls initialization prior to communication.

A FAW detection enable signal 742 is a control signal set by the CPU 400 for starting FAW retrieval of the FAW detector 413.

A through-mode setting signal 741 is set by the CPU 400 and determines whether received data bypasses the FAW detector 413 or not.

First, the operation of the FAW detector 413 when B1 channel data is selected and passed through the FAW detector 413 will be described below.

When the through mode is selected by the through-mode setting signal 741, switch-over circuits 733 and 734 are switched over so that they can output received data 1 (526) and reception channel synchronizing signal (523), respectively. Thus, received data 1 (526) is connected to the D flip-flop 708 via the data switch-over circuit 733, and then sequentially shifted through the D flip-flops 708 through 714 synchronously with the received data synchronizing clock 528.

At a timing indicated by 601 in FIG. 5, received data 1 (526) is connected to and written in a D0 input of the register 415 without change. Also, the output of the D flip-flop 708, which is input to the received data 1 (526) one cycle before the previous data, is connected to and written in a D1 input of the register 415. Similarly, the data of the D flip-flops 709 through 714, which is input in sequence with a one cycle time lag between the adjacent data, is connected to and written in D2 through D7 inputs of the register 415, respectively.

Thus, the FAW detector 413 converts serial data D1 through D8 shown in the timing chart of FIG. 5 into parallel data, and writes it in the register 415 at the time indicated by 601. Next, the FAW detector 413 converts serial data D17 through D24 into parallel data, and writes it in the register 415 next time the reception channel synchronizing signal rises. Thus, the FAW detector 413 performs serial/parallel conversion on B1 channel data alone and writes the converted parallel data in the register 415.

Where B2 channel data is selected and passed through the FAW detector, serial data D9 through D16 shown in the timing chart of FIG. 5 is converted into parallel data and written in the register 415 at the time indicated by 601.

Next, the operation of the FAW detector 413 when B1 channel data is selected and not passed through the FAW detector will be described below.

The detection circuit initializing signal 740 is a signal controlled by the CPU 400 to initialize the FAW detector before communication is started. The reception FAW detector enable signal 743 is a signal controlled by the CPU 400. When FAW detection is conducted, the reception FAW detector enable signal 742 closes the gate 726 by temporarily clearing the output of the D flip-flop 725 prior to detection, and starts FAW detection again after the present sub-multiframe period has passed.

Detection of FAW is conducted not only when communication is initially started but also when FAW bit pattern is not found at a predetermined bit position due to, for example, data error caused by an unknown factor of the communication and hence it is determined that synchronization of the H.221 frame is not available to obtain frame synchronization again.

A FAW synchronization enable signal 743 is a signal with which the CPU 400 determines whether or not initialization of a frame synchronizing signal generating circuit of the FAW detector 413 is made effective.

Figure 12:
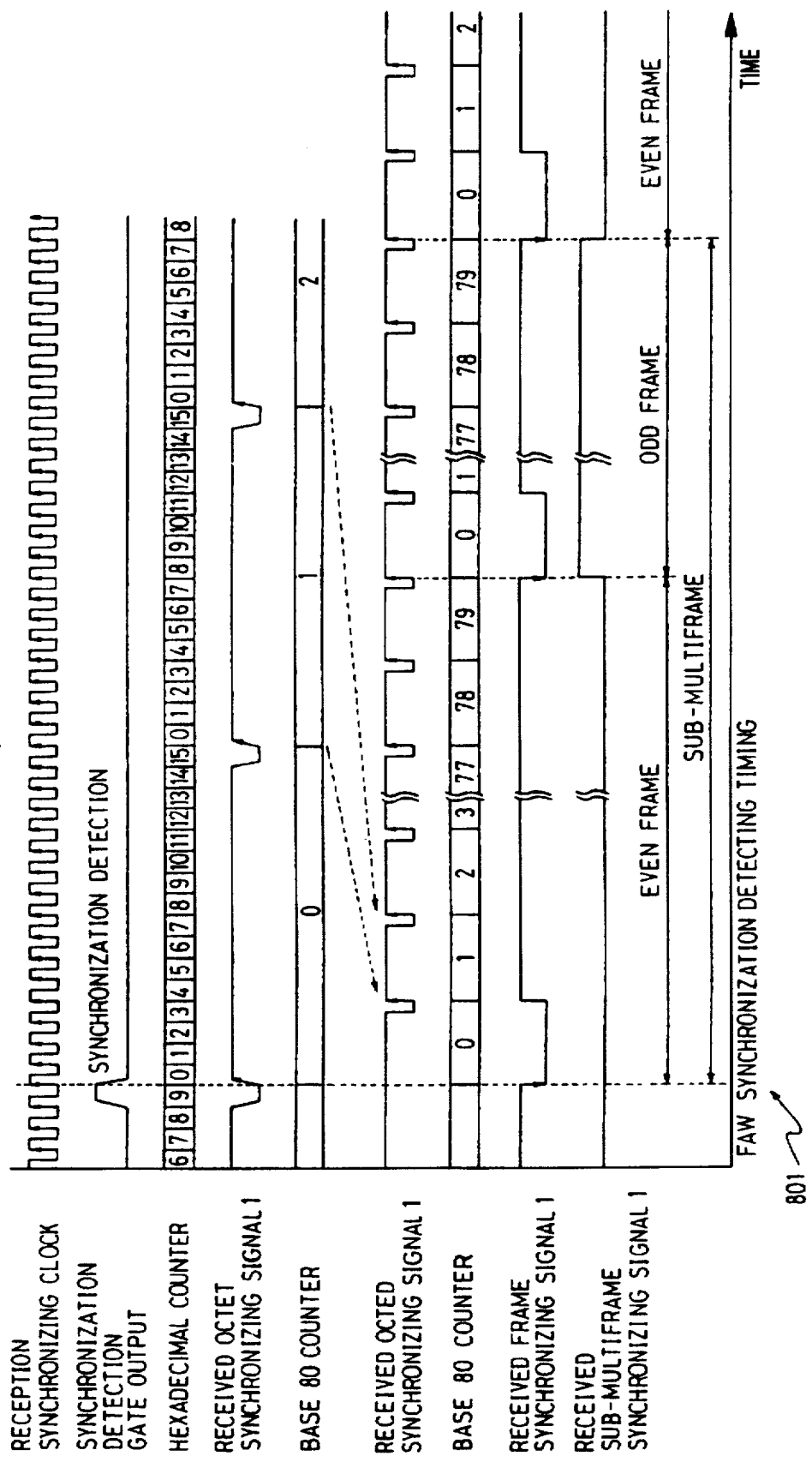
FIG. 12 is a timing chart showing the operation of a hexadecimal counter, base 80 counter and binary counter.

The frame synchronizing signal generating circuit is made up of the hexadecimal counter 731 for generating a reception octet synchronizing signal 1 (752), the base 80 counter 730 for generating a reception frame synchronizing signal 1 (751), a binary counter 728 for generating a reception sub-multiframe synchronizing signal 1 (750). The hexadecimal counter 731, which counts up synchronously with the reception synchronizing clock 522, is initialized to 0 by the output signal of the gate 727. When the counted value of the counter 731 is 0, the hexadecimal counter 731 outputs the L level to both the gate 732 and the base 80 counter 730. The base 80 counter 730 is initialized to 0 by the output signal of the gate 727, and designed to count up synchronously with the output of the hexadecimal counter 731. When the counted value of the base 80 counter 730 is the lowest value, that is, 0, the base 80 counter 730 outputs the L level to the binary counter 728. The binary counter 728 is initialized to 0 by the output signal of the gate 727, and repeatedly outputs the L level and the H level synchronously with the output of the base 80 counter 730. The operation timing chart of these counters is shown in FIG. 12.

The received data 526 and the received data synchronization clock 528, output from the channel switch-over device 412, are input to the delay circuit 701 and to the synchronization detection gate 724. Received data 762, which has been delayed by 1 octet by the delay circuit 701, is input to both the subsequent delay circuit 702 and the synchronization detection gate 724. Received data 763, which has been delayed by another 1 octet, that is, by a total of 2 octets, by the delay circuit 702, is input to both the subsequent delay circuit 703 and the synchronization detection gate 724.

Similarly, received data 764, which has been delayed by another 1 octet, i.e., by a total of 3 octets, by the delay circuit 703, is input to both the subsequent delay circuit 704 and the synchronization detection gate 724. Received data 765, which has been delayed by another 1 octet, that is, by a total of 4 octets, by the delay circuit 704, is input to both the subsequent delay circuit 705 and the synchronization detection gate 724. Received data 766, which has been delayed by another 1 octet, i.e., by a total of 5 octets, by the delay circuit 705, is input to both the subsequent delay circuit 706 and the synchronization detection gate 724. Received data 767, which has been delayed by another 1 octet, i.e., by a total of 6 octets, by the delay circuit 706, is input to both the subsequent delay circuit 707 and the synchronization detection gate 724.

Received data, which has been delayed by another 1 octet, i.e., by a total of 7 octets, by the delay circuit 707, is input to the D flip-flop 708 via the switch-over circuit 733. Thus, a total of 7 bits, which have been selected from the received serial data line at intervals of 1 octet, are input in sequence to the synchronization detection gate 724.

Figure 1:
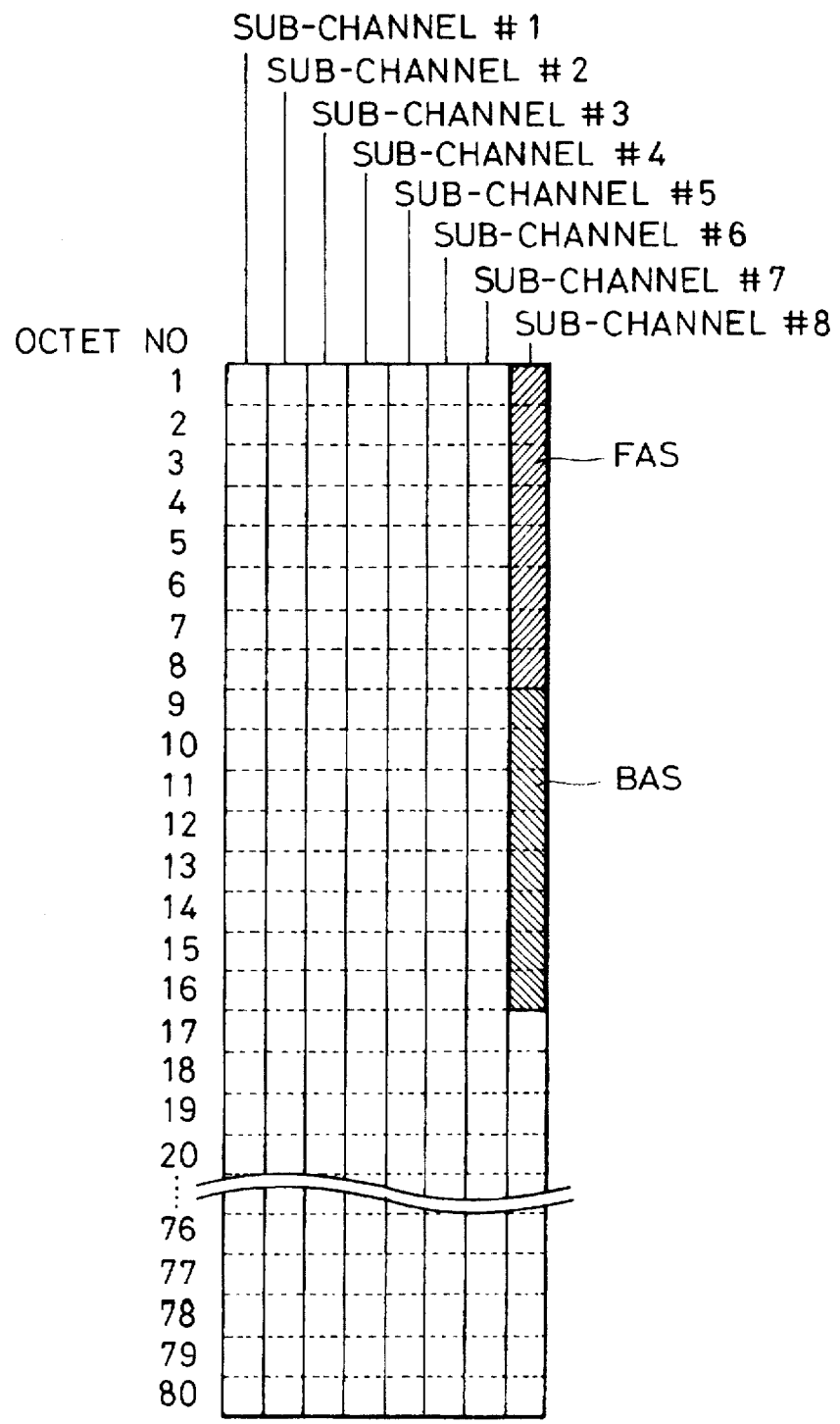
FIG. 1 illustrates the frame structure defined by H.221.

In the frame structure of H.221 shown in FIG. 1, a pair of an odd frame and an even frame constitutes a sub-multiframe structure. In the FAS position of every even frame, a synchronization bit pattern for frame synchronization, "0011011", which is part of the FAW signal, is inserted at positions of octet Nos. 2 through 8. That is, in an even frame, a bit pattern of "0 . . . 0 . . . 1 . . . 1 . . 0 . . . 1 . . . 1" each in a bit is present in a serial data line at intervals of 1 octet.

Thus, a synchronization pattern of "0011011" having intervals of 1 octet is monitored from a serial data row. When that synchronization pattern is detected, it is determined that an even frame is starting with a bit which is 15 bits ahead of the detected leading bit. The synchronization detection gate 724 is a detection gate for that synchronization pattern of "0011011". The gate 724 outputs the H level when it detects "0011011". A Q output of the D flip-flop 714 when the H level is output from the synchronization detection gate 724 is the leading bit data of that frame. Therefore, data of the first octet of the frame is input to the register 415.

In an initial state where communication is started, the output of the D flip-flop is at the H level, and the gate 726 is ON. Thus, when the synchronization detection gate 724 detects a bit pattern of "0011011" after the FAW synchronization enable signal 743 has been made effective, the hexadecimal counter 731, the base 80 counter 730 and the binary counter 728 are initialized. The FAW detection timing indicated by the broken line 801 in FIG. 12 is the initialization timing of the counters.

Once FAW has been detected and frame synchronization has thus been obtained, received data 1 (526) is sequentially shifted through the delay circuits 701 through 707 and D flip-flops 708 through 714, and octet data having the frame structure is thus written in the register 415 synchronously with reception octet synchronizing signal 1 (752).

Figure 13B:
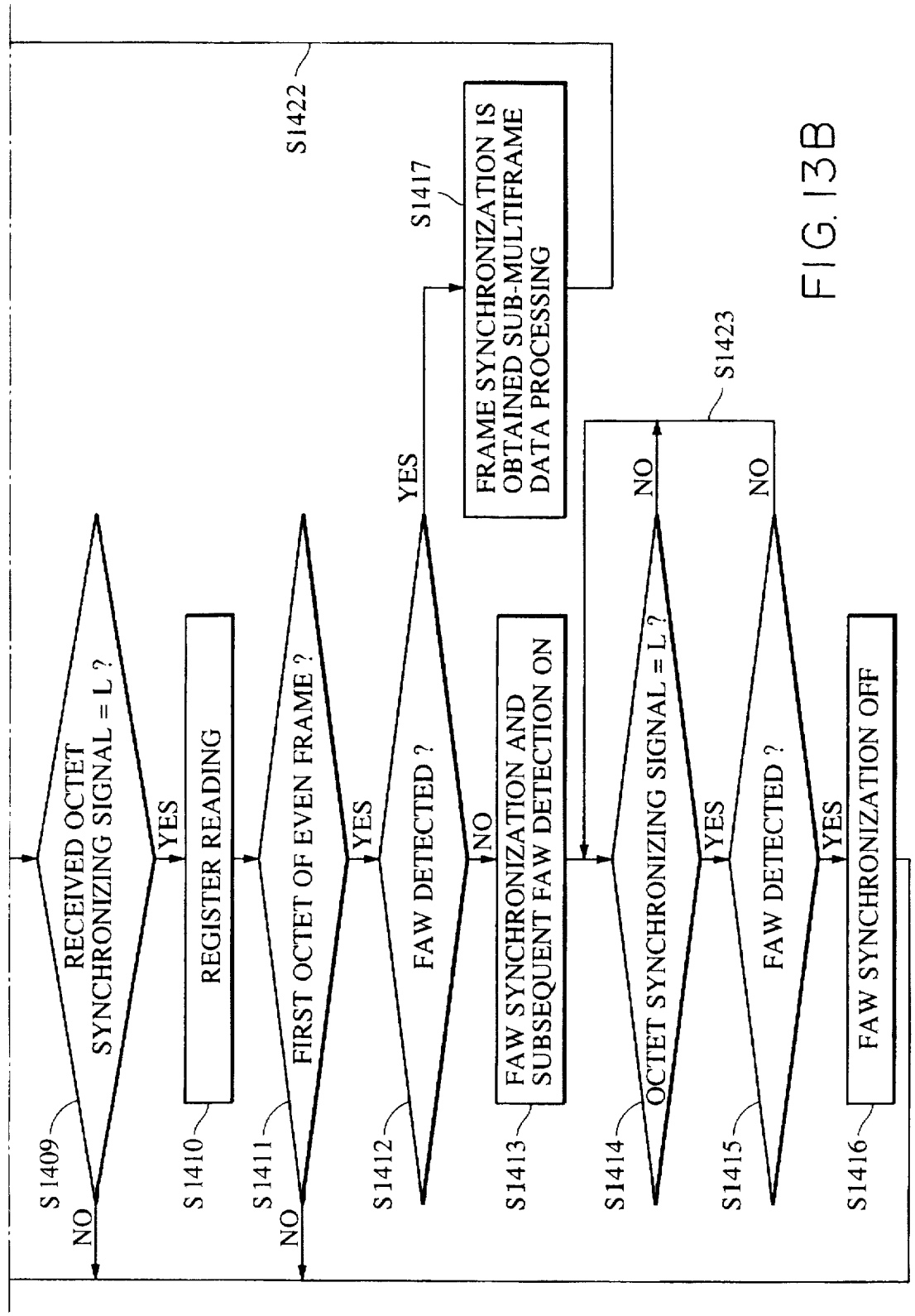
FIG. 13, comprised of 13A and 13B, is a flowchart showing the operation control of the FAW detector.

The operation control flow of the FAW detector 413 will be described below with reference to FIG. 13. The CPU 400 initializes the FAW detector 413 before communication is started.

For initialization in step S1402, (hereinafter "step" is omitted), the CPU 400 sets the D flip-flops to the H level by controlling the initializing signal 520 and the detecting circuit initializing signal 740. Next, to make the FAW synchronization detection function effective (S1403), the CPU 400 turns on the gate 727 by controlling the FAW synchronization enable signal 743. Thereafter, detection of the the reception octet synchronizing signal 1 (752) is awaited (S1404), and the CPU 400 reads the data in the register 716 (S1405), and transfers it to the RAM 401 at an octet timing.

Next, the CPU 400 checks whether the FAW detection signal 754 is detected (S1406). If FAW is not detected, the CPU 400 determines that frame synchronization has not been obtained, and the process goes on a loop (S1420). If FAW is detected and frame synchronization has been obtained, the hexadecimal counter 731, the base 80 counter 730 and the binary counter 728 are initialized to count 0. Hence, if the CPU 400 detects FAW, the FAW synchronization enable signal is turned off (S1407) to inhibit initialization of the hexadecimal counter 731, the base 80 counter 730 and the binary counter 728 the next time FAW is detected.

S1408 is a step in which the process branches to completion (S1418) when communication is ended. If communication is taking place, it is determined whether the reception octet synchronizing signal 1 (752) has the L level (S1409). If the reception octet synchronizing signal 1 (752) is at the L level, the process goes on a loop (S1421) to wait for the detection of the reception octet synchronizing signal 1 (752) (S1409). During this time, the FAW detector 1 (413) is converting serial data into parallel data in units of octets.

If it is determined that the reception octet synchronizing signal 1 (752) is at the L level, the CPU 400 reads the data in the register 415 (S1410) and transfers it to the RAM 401.

Next, the CPU 400 determines whether the read data is the first octet data of an even frame (S1411) by determining whether the reception sub-multiframe synchronizing signal 1 (750) has the L level indicating an even frame and whether the reception frame synchronizing signal 1 (751) has the L level, indicating the first octet data.

If the above-described two conditions are not satisfied, the processing from S1408 to S1411 is repeated.

If the above two conditions are satisfied, i.e., if the first octet data of an even frame is read in, it is determined whether the FAW detection signal 754 has been detected (S1412). If the FAW detection signal has been detected, the data already read from the register 415 is processed as 1 sub-multiframe data (S1417).

If no FAW is detected (S1412) when the first octet data of the even frame has been read (S1411), the CPU 400 determines that frame synchronization is absent, and turns on the subsequent FAW detection enable signal 742 and the FAW synchronization enable signal 743 (S1413) to detect a subsequent FAW. Thereafter, if the octet synchronizing signal is at the L level, the CPU 400 determines whether the FAW detection signal 754 has been detected (S1415). If the FAW detection signal 754 has been detected, the CPU 400 determines that frame synchronization is present again, and turns off the FAW synchronization enable signal 743 (S1416). Thereafter, the process returns to a loop (S1421) which is the sub-multiframe data reading routine S1408 through S1412 and S1417. This process continues until communication is ended (S1408).

Figure 14:
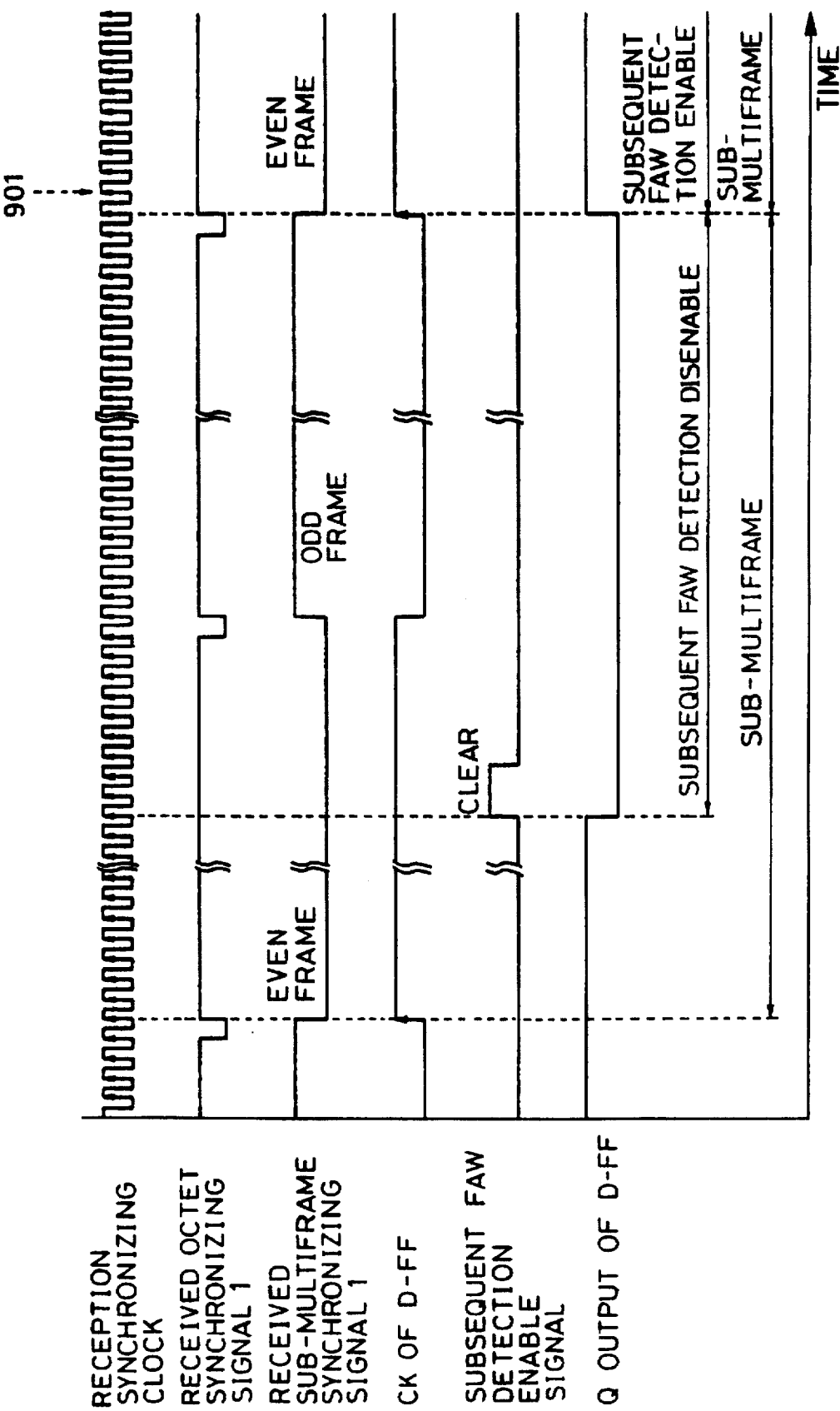
FIG. 14 is a timing chart showing the operation of the FAW detecting unit when a subsequent FAW is detected.

FIG. 14 is an operation timing chart of the D flip-flop 725 when FAW is detected. CK of the D-FF is a clock input thereof. The D flip-flop 725 starts its operation at a rising edge of the input clock.

As shown in FIG. 14, when the subsequent FAW detection enable signal assumes the H level, the D flip-flop 725 is cleared, and the FAW detection gate 726 remains off until the head of a subsequent even frame, i.e., until the head of a sub-multiframe.

The received data which is present in the FAW synchronization detection gate 724 when the gate is turned on at the head of the sub-multiframe is received data 1 (526) and the outputs of the delay circuits 701 through 706, shown in FIG. 11. The data is taken into the delay circuits 701 through 707 at the second clock timing from the head of the sub-multiframe, i.e., at a clock timing 901 shown in FIG. 14. That is, FAW retrieval starts from the bit position which is 1 cycle delayed from the head of the sub-multiframe. Thus, retrieval of the FAW synchronizing signal pattern starts from the bit position which is delayed by 1 clock from a conventional detection timing.

The FAW detector 414 has the same configuration as that of the FAW detector 413 and is operated in the same manner as that described above. The operation of the FAW detectors 413 and 414 for the B1 channel is the same as that for the B2 channel due to the function of the delay circuit 411. The CPU 400 reads out data from the I/O ports 415 and 416 synchronously with the reception octet synchronizing signal 1 (752) and the octet synchronizing signal 2 output from the FAW detectors 413 and 414, respectively.

Data is written in and read from I/O ports 405 through 408, 417 and 418 synchronously with the octet data transfer of transmission data. The structure of the I/O ports 417 and 418 and that of the P/S converter 419 are shown in FIG. 15.

In FIG. 15, reference numerals 417 and 418 denote I/O ports each having double registers. Inputs D0 to D7 of registers 417a and 418a of the first stage are connected to the data bus 430 of the CPU 400. Data is written in the registers 417a and 418a according to reception register write signals 1610 and 1611 from the CPU 400, respectively. The outputs of the registers of the first stage are respectively connected to D0 to D7 of registers 417b and 418b of the second stage. Data is written in the registers of the second stage synchronously with a transmission octet synchronizing signal 1 (1614). The double structure of the registers 417 and 418 enables the CPU 400 to write data in the registers 417 and 418 asynchronously with transmission octet synchronization and to read out data therefrom synchronously with the transmission octet synchronization signal.

A hexadecimal counter 1505 counts up in synchronization with each bit of transmission data. The hexadecimal counter 1505 is initialized synchronously with each octet of transmission data. C4 to C1 of the hexadecimal counter 1505 sequentially count up from "0000" to "1111".

A hexadecimal decoder 1601 is designed such that the H level is output from one of outputs O0 through O15 thereof according to the input value of in4 through in1 thereof. Since the inputs in4 through in1 are respectively connected to the count outputs C4 through C1, the output O0 of the hexadecimal decoder 1601 outputs the H level while the outputs O1 through O15 assume the L level at the transmission octet timing. At a time 1 clock after the transmission octet timing, the output O1 assumes the H level while the outputs O and O2 through O15 assume the L level. Thereafter, the L level shifts from O2, O3, . . . O15, O0, O1 sequentially synchronously with the transmission clock.

Gates 1603 and 1604 are designed such that one of inputs SD0 through SD15 is selected according to the H level output of the hexadecimal decoder 1601. As a result, the gates 1603 and 1604 output received serial data 1612 via an OR gate 1602. Since the hexadecimal counter 1505 performs counting synchronously with transmission data of 128 kHz, the received parallel data written in the I/O registers 417 and 418 are converted into serial data of 128 kHz in the S/P conversion circuit 419.

R-V1 enable 1620 through R-V4 enable 1623 are signals which indicate to which sub-channels of the H.221 frame first to fourth received video data are respectively allocated. If the first received video data is allocated to sub-channels #7 and #8 of the master frame, R-V1 enable signal (1620) assumes the H level when the outputs O6 and O7 of the hexadecimal decoder 1601 output the H level. At other times, R-V1 enable signal (1620) has the L level. This also applies to R-V2 enable (1621) through R-V4 enable (1623). In other words, the R-V1 enable 1620 through R-V2 enable 1623 assume the L level when no received video data is allocated to the sub-channels.

R-A1 enable (1623) through R-A4 enable (1627) are signals which indicate to which sub-channels in the H.221 frame first to fourth received audio data are respectively allocated. Like R-V1 enable (1620), R-A1 enable (1623) through R-A4 enable (1627) assume the H level when the corresponding sub-channels are chosen.

R-L1 enable (1628) and R-L2 enable (1629) indicate to which sub-channels in the H.221 frame first and second received LSD communication data are respectively allocated. Like R-V1 enable (1620), R-L1 enable (1623) and R-L2 enable (1629) assume the H level when the corresponding sub-channels are chosen.

A reception FAS/BAS mask signal 1520 indicates that the bit of the serial data 1612 is FAS or BAS bit of the H.221 frame structure. When the bit of the serial data 1612 is either FAS or BAS bit, the reception FAS/BAS mask signal 1520 assumes the L level. At other bit times, the signal has the H level.

Gates 1605, 1606 and 1607 receive the received serial data 1612, the enable signals 1620 through 1629 and the reception FAS/BAS mask signal 1520, implement a logical function thereon, and output received video data 1 through 4 (1630 through 1633) to the respective video decoding units 307 through 310, received audio data 1 through 4 (1634 through 1637) to the respective audio decoding units 311 through 314, and received LSD 1 and 2 (1638 and 1639) to the respective LSD communication units 320 and 321.

The video decoding unit 307 reads in the received video data 1 (1630) as effective received data and performs decoding thereon when the R-V1 enable (1620) is at the H level and the reception FAS/BAS mask signal is at the H level. Similarly, the video decoding units 308 through 310 respectively read in the received video data 2 through 4 (1631 through 1633) as effective data and perform decoding thereon when both R-V2 enable through R-V4 enable (1621 through 1623) and the reception FAS/BAS mask signal are at the H level. Like the video decoding units, the audio decoding units 1 through 4 (311 through 314) also read in the audio received data 1 through 4 (1634 through 1637) as effective data and perform decoding thereon when R-A1 enable through R-A4 enable (1624 through 1627) and the reception FAS/BAS mask signal 1520 are at the H level. Similarly, the LSD communication units 320 through 321 also read in the received LSD data 1 and 2 (1638 and 1639) as effective received data when R-L1 enable and R-L2 enable (1628 and 1629) and the reception FAS/BAS mask signal 1620 are at the H level.

Figure 16:
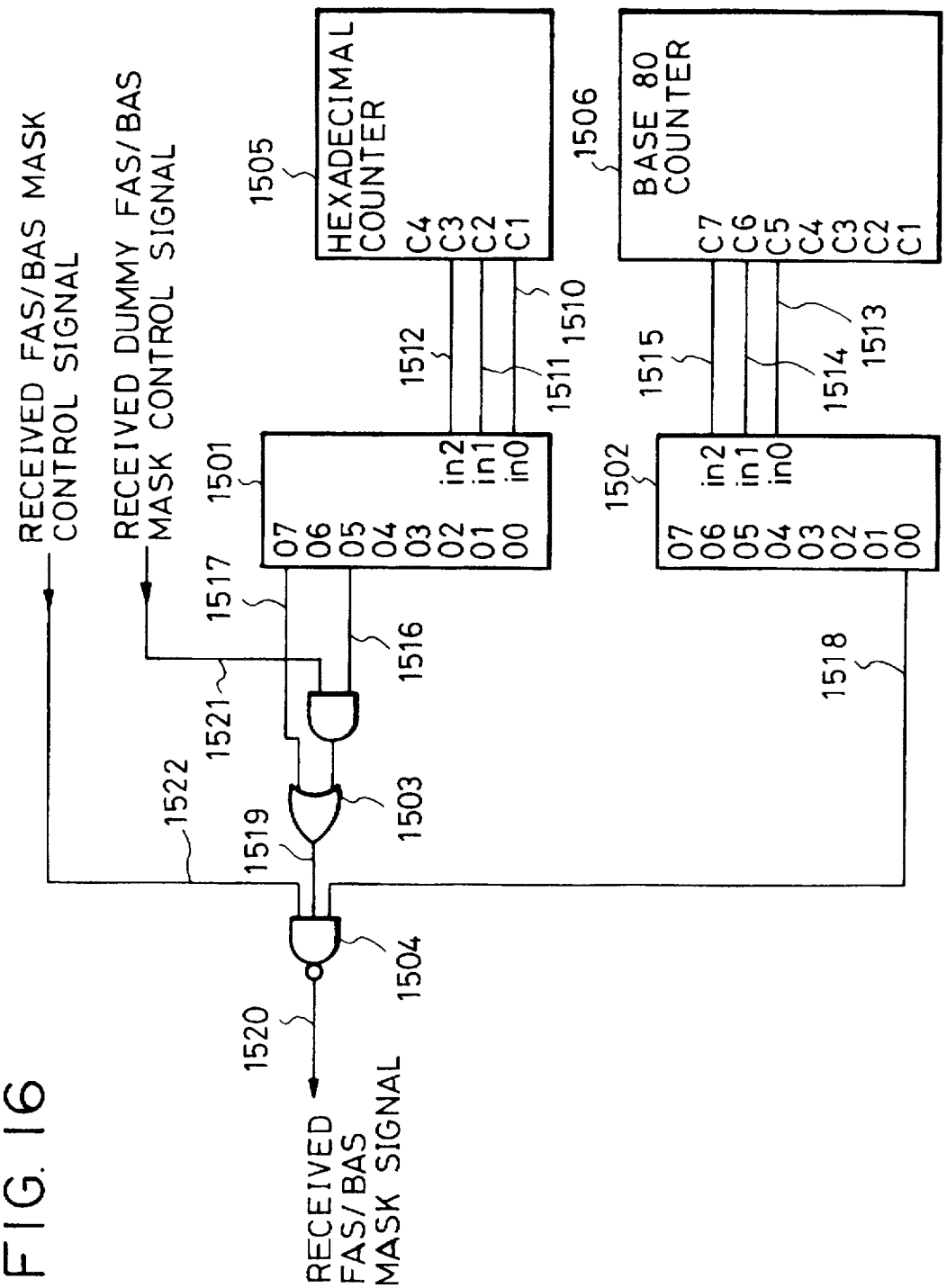
FIG. 16 illustrates a reception FAS/BAS mask signal generating circuit.

FIG. 16 illustrates a generating circuit of the reception FAS/BAS mask signal 1520. The hexadecimal counter 1505 counts up synchronously with the transmission data clock, and is initialized to 0 synchronously with the transmission octet timing. Reference numeral 1506 denotes a base 80 counter which counts up synchronously with the transmission octet timing. The base 80 counter 1506 generates timing of the H.221 frame structure of transmission data.

Reference numeral 1501 denotes an octal decoder which is designed such that outputs O0 through O7 sequentially assume the H level one output at a time, the output having the H level depending on the values of the inputs in2 through in0. Since only the three least significant bits (1510 through 1512) of the outputs C4 through C1 are respectively connected to the inputs in2 through in0, for example, the output O7 (1517) of the octal decoder 1501 outputs the H level at the eighth and sixteenth countings of the hexadecimal counter 1505 which are at counting values 7 and 15, respectively. Thus, the outputs O0 through O7 of the octal decoder 1501 respectively indicate the sub-channels #1 through #8 of each of the master transmission frame and slave transmission frame.

Reference numeral 1502 denotes an octal decoder which is designed such that outputs O0 through O7 thereof sequentially assume the H level, one output at a time, the output having the H level depending on the values of the inputs in2 through in0, like the octal decoder 1501. Since the three high order bits C7 (1515) through C5 (1512) of the outputs of the base 80 counter 1506 are respectively connected to inputs in2 through in0, the output O0 assumes the H level when the counting value of the base 80 counter 1506 is from 0 to 15, and then the output O1 assumes the H level when the counting value of the base 80 counter 1506 is from 16 to 31. Thereafter, the outputs O2 through O7 of the octal decoder 1502 similarly assume the H level in sequence every 16 counting values of the base 80 counter 1506.

A signal 1521 is a dummy reception FAS/BAS mask control signal with which the CPU 400 controls whether or not the dummy reception FAS/BAS mask signal 1516 of sub-channel #6 is made effective. When the signal 1521 assumes the L level, the dummy FAS/BAS mask signal becomes effective. When the signal 1521 assumes the H level, the dummy FAS/BAS signal becomes invalid.

A signal 1522 is a reception FAS/BAS mask control signal with which the CPU 400 controls whether or not the reception FAS/BAS mask is made effective. When the signal 1522 assumes the H level, FAS/BAS mask of the received data becomes effective. When the signal 1522 assumes the L level, FAS/BAS mask of the received data becomes invalid. Nullity of FAS/BAS mask occurs when the communication data does not have the H.221 frame structure or when it is not in the H.221 non-frame mode.

Figure 17:
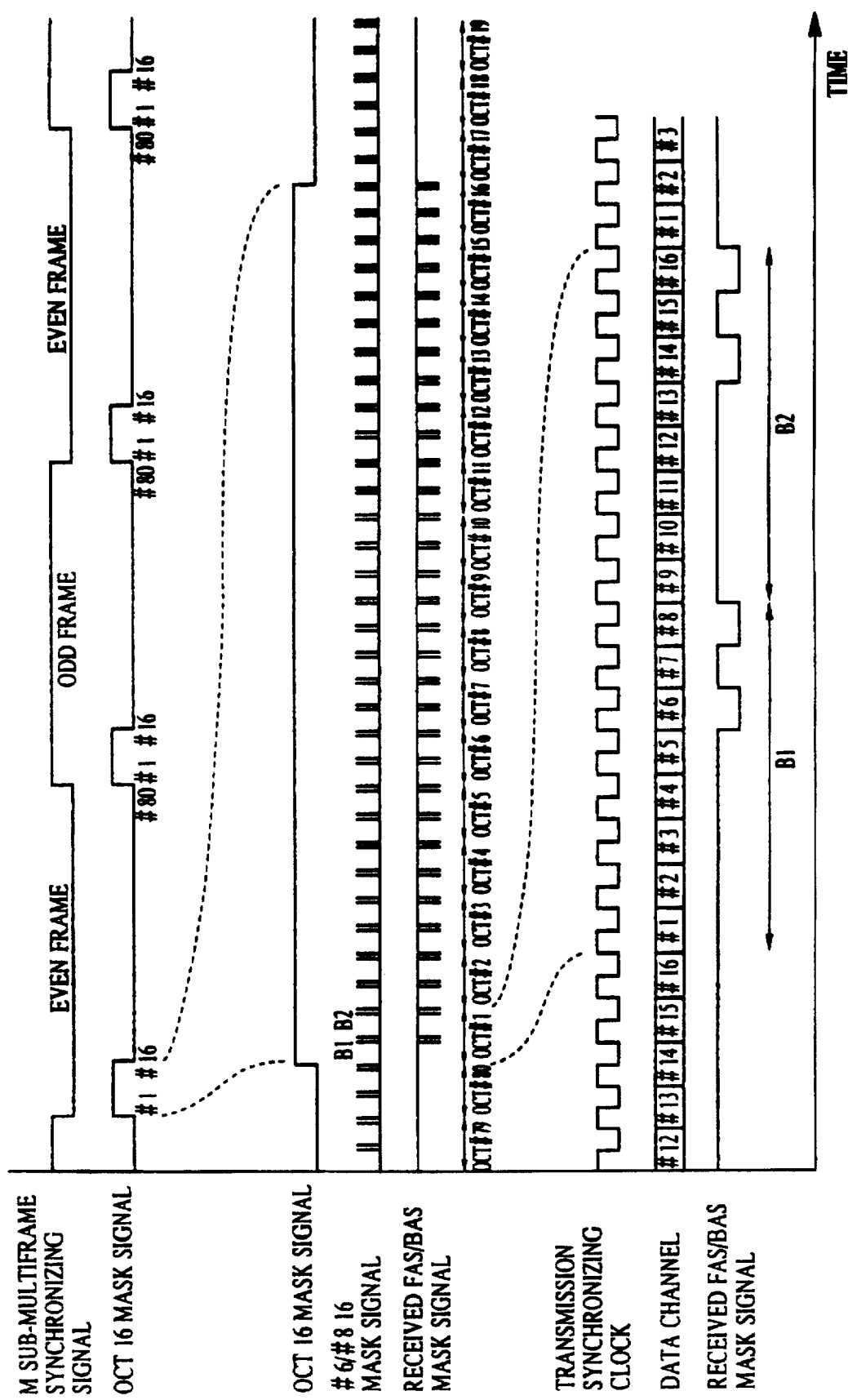
FIG. 17 is a timing chart showing the operation of the reception FAS/BAS mask signal generating circuit.

The timing chart of the reception FAS/BAS mask signal is shown in FIG. 17. In FIG. 17, an M sub-multiframe synchronizing signal is a sub-multiframe synchronizing signal for the master channel of the transmission data H.221 frame. The L level of the M sub-multiframe synchronizing signal indicates an even frame, and the H level thereof indicates an odd frame. An OCT 16 mask signal indicates a period between the first octet and the sixteenth octet, and is the O0 output signal 1518 of the octal decoder 1502 shown in FIG. 16. A #6/#8 mask signal indicates the timing of sub-channel #6 and that of sub-channel #8, and is the output signal 1519 of a gate 1503.

It can be seen from FIG. 17 that when the logical function is performed by a logic gate on the serial data 1612 using the reception FAS/BAS mask signal, the data located at the FAS/BAS and dummy FAS/BAS bit positions, shown in FIG. 4, can be removed.

Figures 18, 18A:
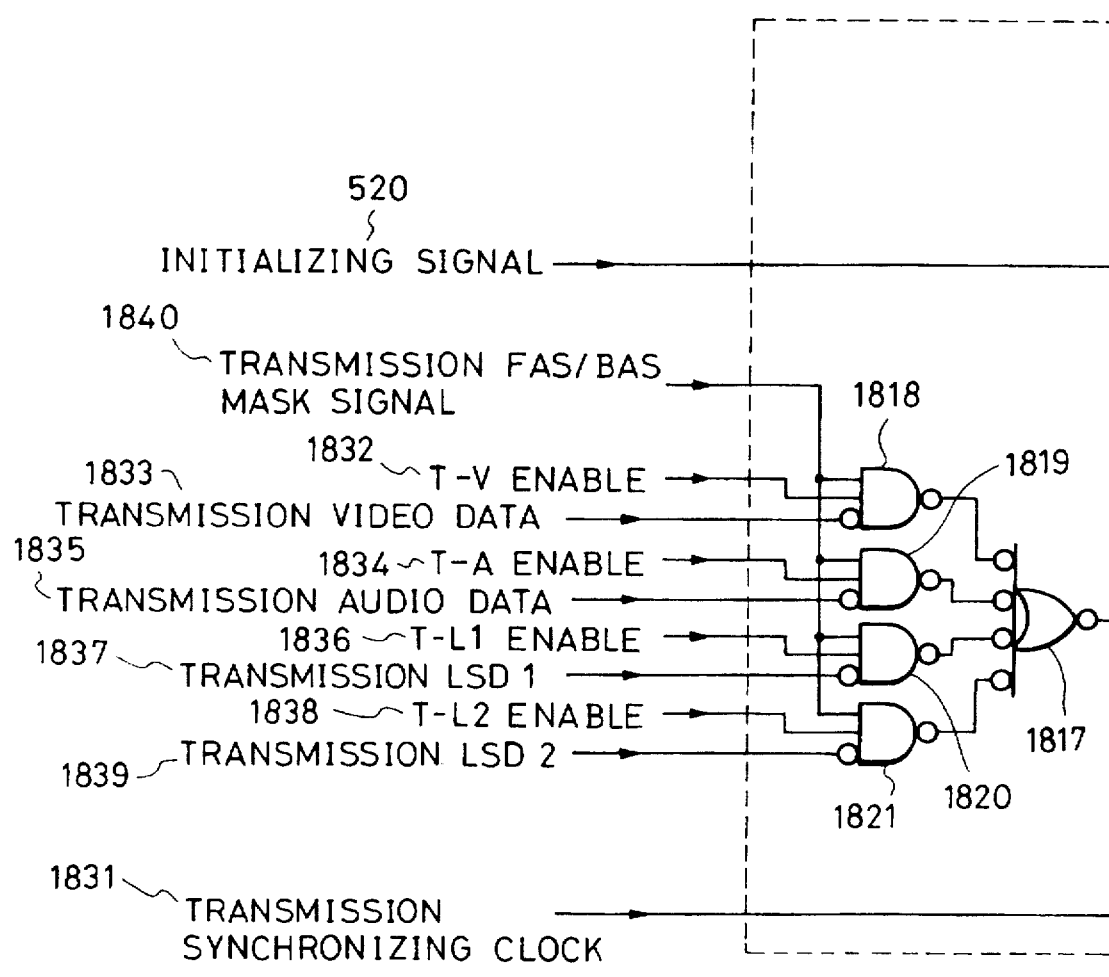
FIG. 18, comprised of FIGS. 18A and 18B, illustrates the detailed structure of a S/P converter.
Figure 18B:
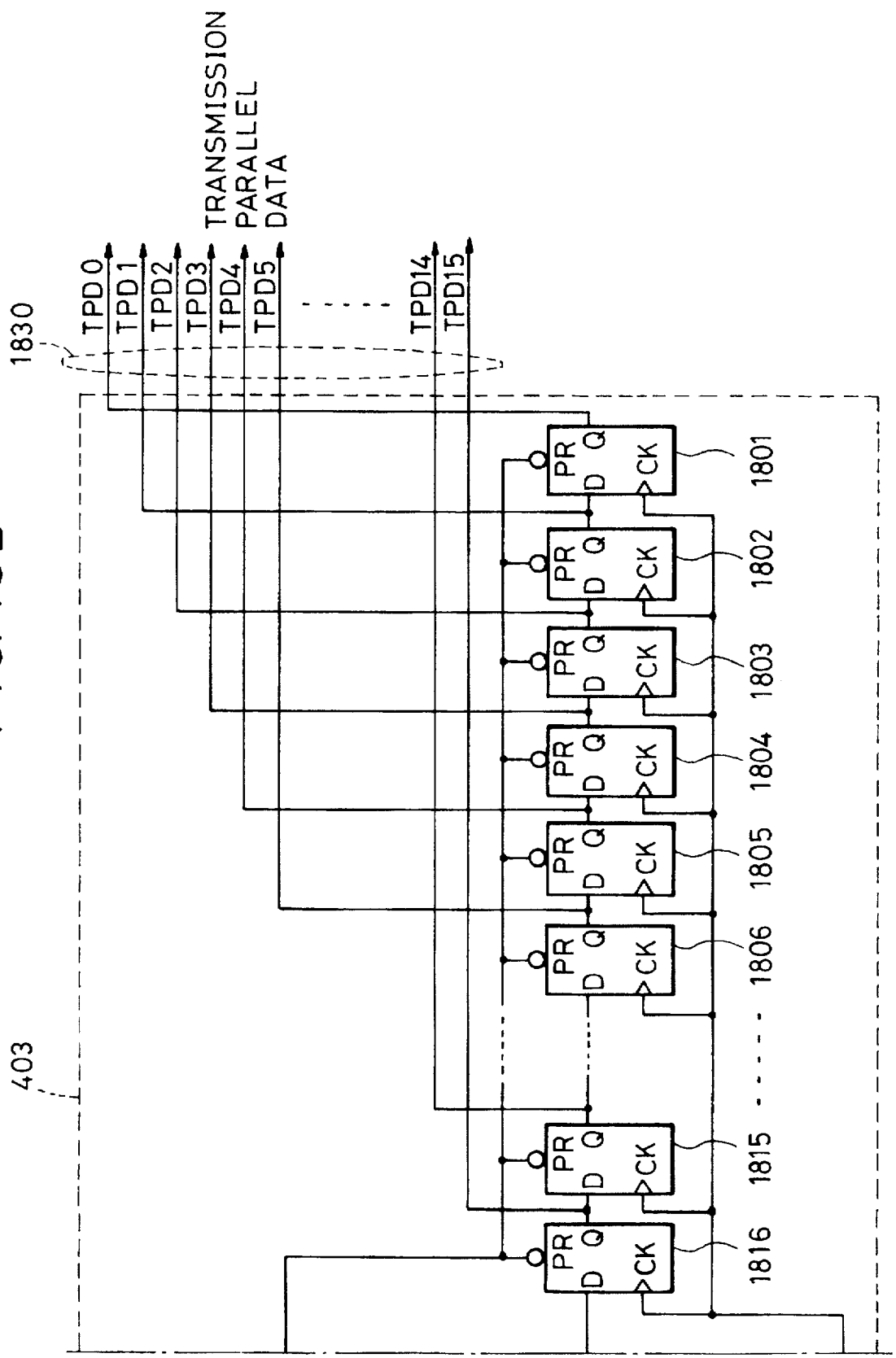

FIG. 18 illustrates the structure of the S/P converter 403 for converting transmission serial data, such as transmission video data or transmission audio data, into parallel data. A T-V enable 1832 is a signal which indicates reading of transmission video data 1833 from the video coding unit 305. A T-A enable 1834 is a signal which indicates reading of transmission audio data 1835. A T-L1 enable 1836 is a signal which indicates reading of transmission data 1837 from the LSD communication unit 320. A T-L2 enable 1838 is a signal which indicates reading of transmission data 1839 from the LSD communication unit 321. D flip-flops 1801 through 1816 constitute a 16-stage shift register which sequentially reads the transmission data enabled synchronously with the transmission synchronizing clock 1831

An example of data transmission will be described below. It is assumed that data transmission is performed in the frame structure shown in FIG. 4 through a communication which employs the B1 channel. In this case, T-V enable 1832 becomes effective at the timing of sub-channel #5 of the transmission frame. T-A enable 1834 becomes effective at the timing of sub-channels #1 and #2 of the transmission frame. T-L1 enable 1836 becomes effective at the timing of sub-channel #6 of the transmission frame. The audio coding unit 306 outputs the effective transmission audio data 1835 when T-A enable 1834 assumes the H level and when the transmission FAS/BAS mask signal 1840 assumes the H level. The video coding unit 305 outputs the effective transmission video data 1833 when T-V enable 1832 assumes the H level and when the transmission FAS/BAS mask signal 1840 assumes the H level.

The LSD communication unit 320 outputs the effective transmission LSD1 1837 when T-L1 enable 1836 assumes the H level and when the transmission FAS/BAS mask signal 1840 assumes the H level. The LSD communication unit 321 outputs the effective transmission LSD2 1839 when T-L2 enable 1838 assumes the H level and when the transmission FAS/BAS mask signal 1840 assumes the H level.

Thus, the transmission audio data 1835 is first input to and shifted in sequence in the D flip-flop 1816 synchronously with the transmission synchronizing clock 1831. During the period of sub-channels #3 and #4, all the enable signals have the L level, and invalid data having the H level is thus input to the D flip-flop 1816. Subsequently, the transmission video data 1833 and the transmission LSD1 (1837) are input to and shifted in the D flip-flop 1816 in sequence. During the period of sub-channels #7 and #8, all the enable signals have the L level, and invalid data having the H level is thus input to the D flip-flop.

Subsequently, data of the B2 channel is input. In this example of data transmission, since communication is performed through the B1 channel alone, all the enable signals have the L level during the B2 channel period, i.e., during the period of the subsequent 8 clocks, and invalid data having the H level is thus input to and shifted in the D flip-flop 1816. Thus, 16 clocks after the input of initial data, the initially input transmission data has been shifted to and stored in the D flip-flops 1801 and 1802, the subsequently input transmission video data has been shifted to and stored in the D flip-flop 1805, and the LSD1 transmission data has been shifted to and stored in the D flip-flop 1806. Thus, by reading out the outputs of the D flip-flops 1801 through 1816, serial transmission video data, transmission audio data and transmission LSD1 data can be read out in the form of parallel data 1830 in which each data is allocated to the corresponding sub-channel.

Figure 19A:
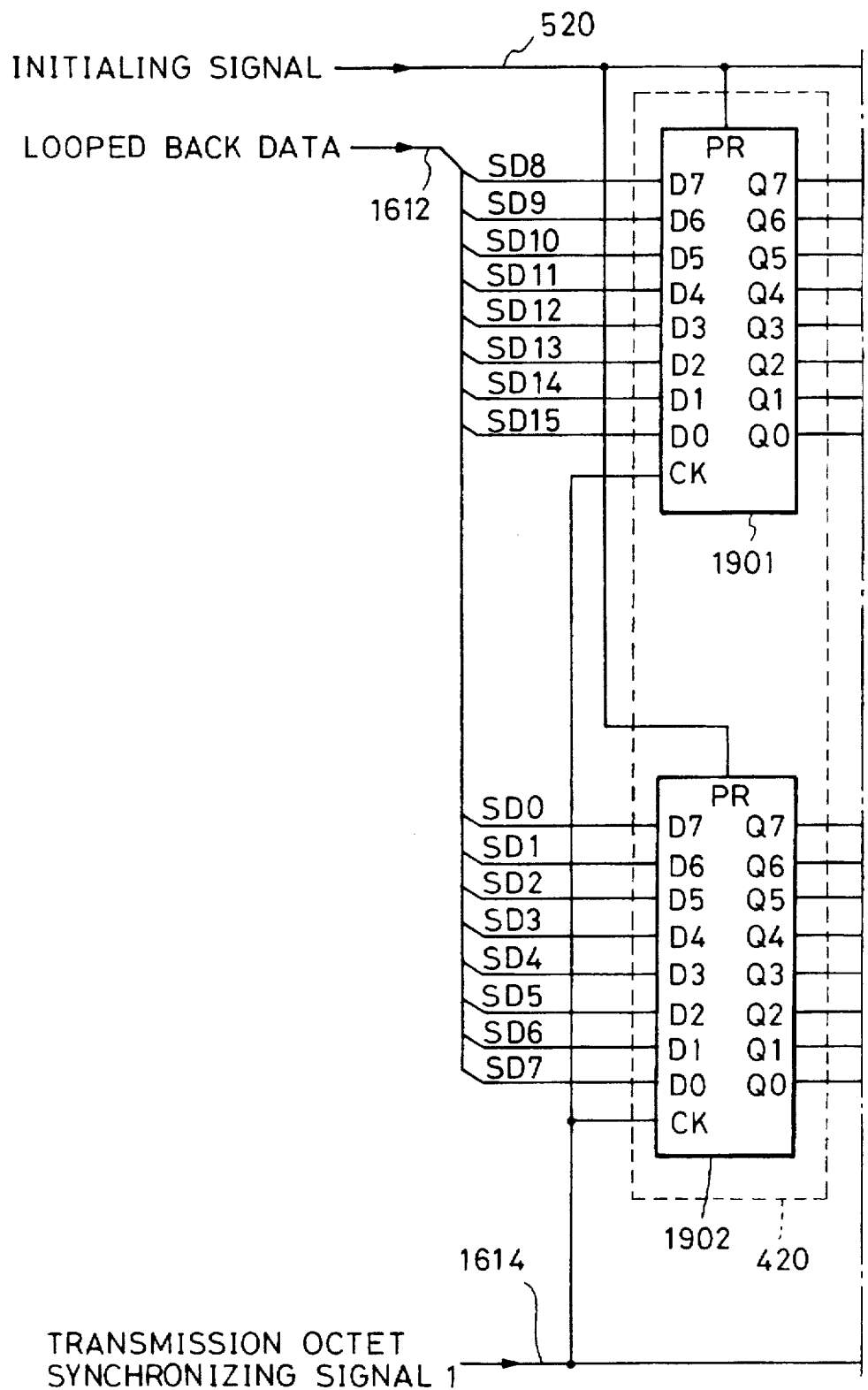
FIG. 19, comprised of FIGS. 19A, 19B and 19C, illustrates the detailed structure of a loop back port, a slot distributor and I/O ports.
Figure 19B:
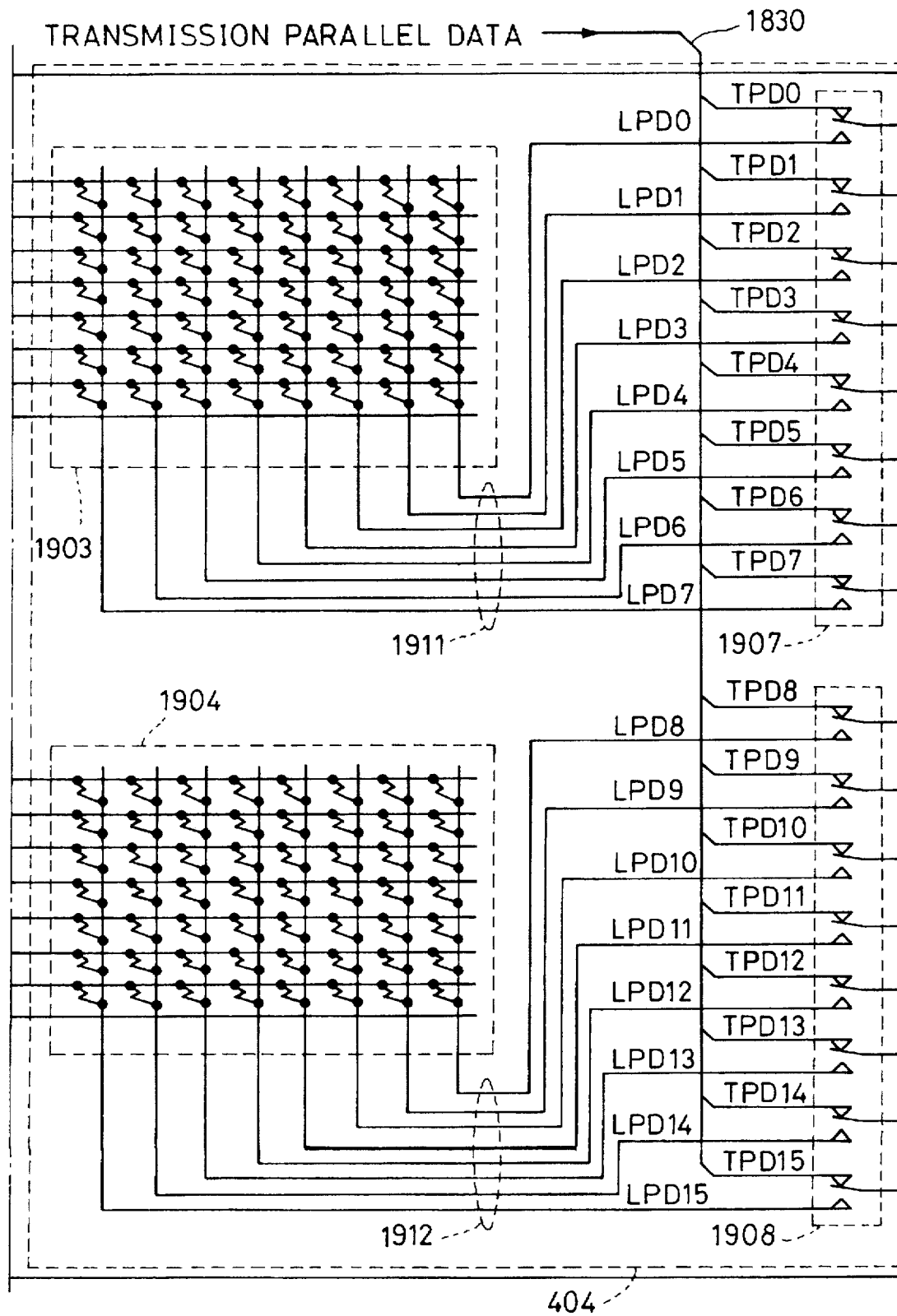

FIG. 19 illustrates the structure of the loop back port 420, slot distributor 404, I/O port 1 (405) and I/O port 2 (406). Reference numerals 1901, 1902, 1905 and 1906 denote 8-bit data registers. Reference numerals 1903 and 1904 denote 8×8 switch-over circuits controlled by the CPU 400. Reference numerals 1907 and 1908 denote input selecting circuits controlled by the CPU 400.

In loop back data 1612 looped back by the I/O ports 417 and 418, data SD8 through SD15 of the reception slave side register 418b are respectively connected to inputs D0 through D7 of the transmission master side register 1901, and data SD0 through SD7 of the reception master side register 418b are respectively connected to inputs D0 through D7 of the transmission slave side register 1902. The registers 1901 and 1902 take in the loop back data SD0 through SD15 synchronously with the transmission octet synchronizing signal 1 (1614), and output the data from outputs Q0 through Q15 to the switch-over circuits 1903 and 1904.

Under the control of the CPU 400, the switch-over circuit 1903 selects any bit from Q0 through Q7 outputs of the register 1901 and connects the selected bit to any of bit positions TPD0 through TPD7. Under the control of the CPU 400, the switch-over circuit 1904 also connects any bit of Q0 through Q7 outputs of the register 1902 to any of bit positions TPD8 through TPD15.

The input selecting circuit 1907 is controlled by the CPU 400 and selects either of LPD0 through LPD7 or TPD0 through TPD7 for every bit, and connects the selected bit to D0 through D7 inputs of the master register 1905. The register 1905 takes in the selected data synchronously with the transmission octet synchronizing signal 1 (1614). Similarly, the input selecting circuit 1908 is also connected by the CPU 400 and selects either of LPD8 through LPD15 or TPD8 through TPD15 for every bit, and connects the selected bit to D0 through D7 inputs of the slave side register 1906. The outputs of the registers 1905 and 1906 are respectively connected to the data bus 430 through the I/O ports 405 and 406. Thus, the CPU 400 can read data from the registers 1905 and 1906 by generating a master register read signal 1913 and a slave register read signal 1914, respectively.

Figure 20A:
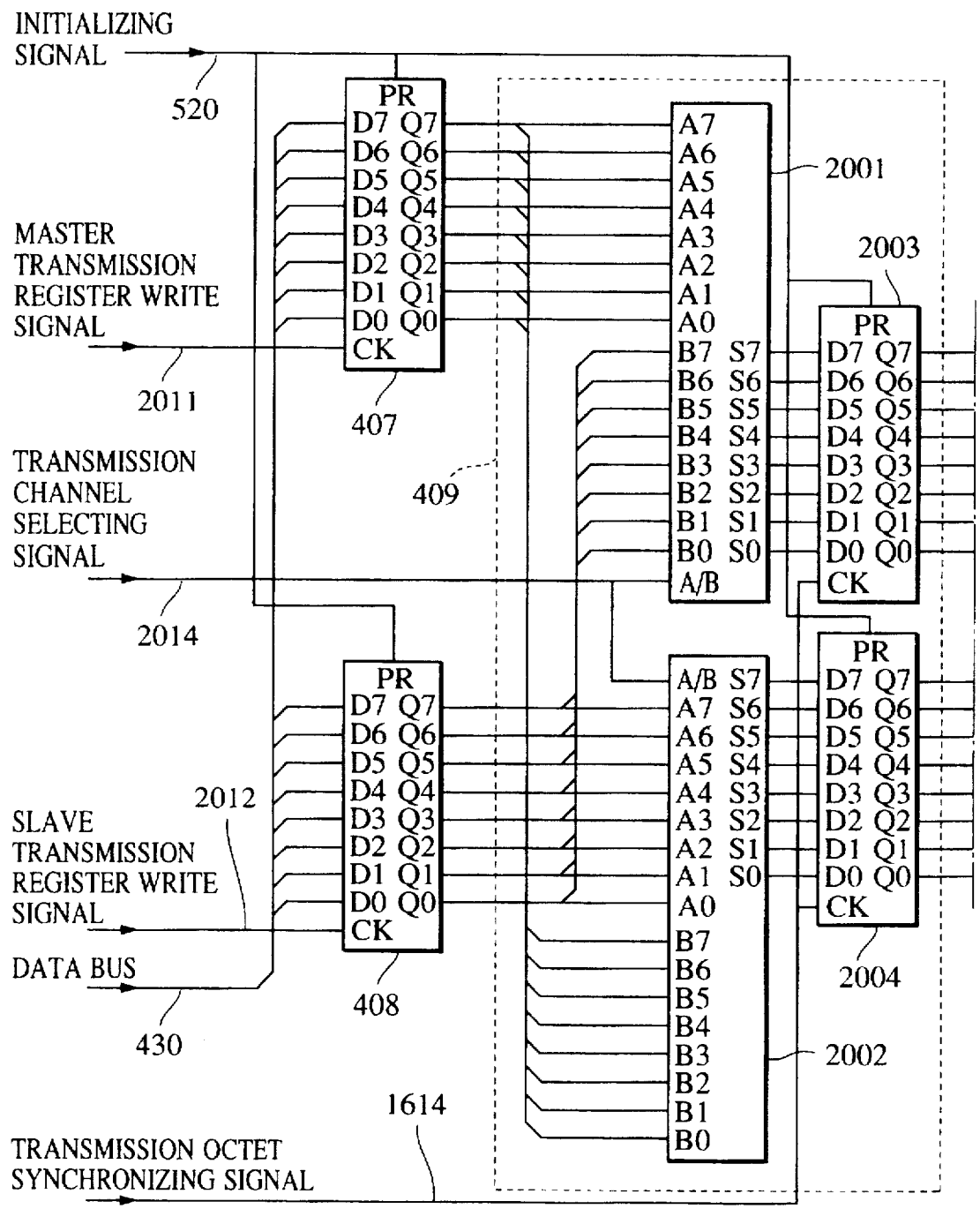
FIG. 20, comprised of FIGS. 20A and 20B, illustrates the detailed structure of I/O ports, a channel switch-over device and a P/S converter.

FIG. 20 illustrates the structure of the channel switch-over device 409, P/S converter 410, I/O ports 407 and 408. Reference numerals 407, 408, 2003 and 2004 denote 8-bit registers. Reference numerals 2001 and 2002 denote switch-over circuits. Reference numerals 2006 and 2007 denote AND gates. Reference numeral 2008 denotes an OR gate.

The CPU 400 writes the transmission master frame data in the register 407 through the data bus 430 by a master transmission register write signal, and writes the transmission slave frame data in the register 408 via the data bus 430. The transmission data written in the registers 407 and 408 are respectively written in the registers 2003 and 2004 through the switch-over circuits 2001 and 2002 synchronously with the transmission octet synchronizing signal 1 (1614).

In each of the switch-over circuits 2001 and 2002, when a transmission channel selecting signal 2014 controlled by the CPU 400 assumes the H level, inputs A0 through A7 are respectively connected to outputs S0 through S7. When the transmission channel selecting signal 2014 assumes the L level, inputs B0 through B7 are respectively connected to the outputs S0 through S7. The transmission data written in the registers 2003 and 2004 are sequentially selected bit by bit by the output of the hexadecimal decoder and converted into serial data. A generated output 2013 is sent out to the network control unit 319.

While a preferred embodiment of the invention has been described, it is to be understood that changes and variations may be made without departing from the spirit or scope of the following claims.

For example, while the above-described embodiment has been described wherein respective Bchs of a single ISDN basic rate interface are connected to sites separate from each other, alternate embodiments might include a communication terminal apparatus which utilizes a plurality of basic rate interfaces which are connected to sites separate from each other.

In addition to the ISDN basic rate interface network, a higher speed data communication network may also be employed. A low-speed data communication network may also be employed. Furthermore, the communication terminal apparatus may be connected to an existing telephone network via a modem.

Further, a dummy FAS/BAS signal, which is a false synchronizing signal, may be added to a channel of any type of data.

Further, while the functions of this embodiment are implemented by a combination of hardware and software, they may be implemented solely by hardware or software. Alternatively, the proportion of hardware processing to software processing may be varied.

In other words, the foregoing description of embodiments has been given for illustrative purposes only and is not to be constructed as imposing any limitation in every respect.

The scope of the invention is, therefore, to be determined solely by the following claims and is not limited by the text of the specification and alterations made within the scope of the claims fall within the true spirit and scope of the invention.

What is claimed is:

1. A communication terminal apparatus for multiplexing a plurality of different types of data and for performing communications of multiplexed data, comprising:

control means connected to a communication network for controlling communication with the network so as to transmit and receive pluralities of different types of data to and from the network;

multiplexing means for generating transmission data by multiplexing a plurality of different types of data and for outputting the transmission data to said control means;

synchronization means for generating a transmission synchronization signal for said multiplexing means;

separation means for separating reception data, received from the network by said control means and then supplied to said separation means, by data type synchronously with said transmission synchronizing signal generated by said synchronization means to form separated reception data; and generating means for generating other data, wherein said multiplexing means generates the transmission data by multiplexing the separated reception data with the other data.

2. The communication terminal apparatus according to claim 1, wherein said pluralities of different types of data contain at least image data.

3. The communication terminal apparatus according to claim 1, further comprising a loop back path for looping back and inputting the separated reception data to said multiplexing means.

4. The communication terminal apparatus according to claim 3, further comprising looped back data selection means for selecting some of the separated reception data to be looped back to said multiplexing means via said loop back path from said separation means.

5. The communication terminal apparatus according to claim 4, wherein when said multiplexing means multiplexes the separated reception data selected to be looped back via said loop back path, dummy data is inserted in the looped back data.

6. A communication terminal apparatus for multiplexing a plurality of different types of data and for performing communications of said multiplexed data, comprising:

control means connected to a communication network for controlling communication with the network so as to transmit and receive pluralities of different types of data to and from the network;

multiplexing means for generating transmission data by multiplexing a plurality of different types of data and for outputting the transmission data to said control means;

separation means for separating reception data, received from the network by said control means and then supplied to said separation means, by data type to form separated reception data; and generating means for generating other data, wherein multiplexing by said multiplexing means and separation by said separation means are performed on a basis of a common timing signal such that said multiplexing means multiplexes the separated reception data with the other data.

7. The communication terminal apparatus according to claim 6, wherein said pluralities of different types of data include image data.

8. The communication terminal apparatus according to claim 6, further comprising a loop back path for looping back and inputting the separated reception data to said multiplexing means.

9. The communication terminal apparatus according to claim 8, further comprising looped back data selection means for selecting some of the separated reception data to be looped back to said multiplexing means via said loop back path from said separation means.

10. The communication terminal apparatus according to claim 9, wherein when the separated reception data selected to be looped back via said loop back path is multiplexed by said multiplexing means, dummy data is inserted in the looped back data.

11. A communication terminal apparatus for multiplexing a plurality of different types of data and for performing communications of said multiplexed data, comprising:

control means connected to a communication network for controlling communication with the network so as to transmit and receive pluralities of different types of data to and from the network;

separation means for separating multiplexed data, received from the network by said control means and then supplied to said separation means, by data type to form separated reception data;

multiplexing means for generating transmission data by multiplexing a plurality of different types of data and for outputting the transmission data to said control means, each of the plurality of different types of data being multiplexed being composed in frames including a slot for control data regarding synchronization;

a loop back path for looping back and inputting the separated reception data to said multiplexing means; and addition means for adding dummy data to the looped back separated reception data for multiplexing by said multiplexing means, such that the slot for control data in the looped back separated reception data is filled with the dummy data.

12. The communication terminal apparatus according to claim 11, wherein said plurality of different types of data are transmitted in a coded form.

13. The communication terminal apparatus according to claim 12, further comprising decoding means for decoding coded data received by said control means.

14. The communication terminal apparatus according to claim 13, wherein said loop back path turns back coded data which has not yet been decoded by said decoding means.

15. The communication terminal apparatus according to claim 14, wherein said plurality of different types of data includes image data.

* * * * *